United States Patent
Fukasawa et al.

(10) Patent No.: US 10,357,988 B2
(45) Date of Patent: Jul. 23, 2019

(54) PAPER-MADE STAPLE AND PAPER-MADE STAPLE ASSEMBLY

(71) Applicants: Eiji Fukasawa, Yamanashi-ken (JP); Junya Nakajima, Yamanashi-ken (JP); Takuma Kobayashi, Yamanashi-ken (JP); Takashi Saito, Yamanashi-ken (JP); Isao Kondo, Yamanashi-ken (JP); Seiji Ono, Yamanashi-ken (JP); Kenichi Yoshimura, Yamanashi-ken (JP)

(72) Inventors: Eiji Fukasawa, Yamanashi-ken (JP); Junya Nakajima, Yamanashi-ken (JP); Takuma Kobayashi, Yamanashi-ken (JP); Takashi Saito, Yamanashi-ken (JP); Isao Kondo, Yamanashi-ken (JP); Seiji Ono, Yamanashi-ken (JP); Kenichi Yoshimura, Yamanashi-ken (JP)

(73) Assignee: CANON FINETECH NISCA INC., Misato-Shi, Saitama (JP)

( * ) Notice: Subject to any disclaimer, the term of this patent is extended or adjusted under 35 U.S.C. 154(b) by 11 days.

(21) Appl. No.: 15/208,147

(22) Filed: Jul. 12, 2016

(65) Prior Publication Data
US 2016/0318331 A1 Nov. 3, 2016

Related U.S. Application Data

(62) Division of application No. 14/491,314, filed on Sep. 19, 2014, now Pat. No. 9,428,362.

(30) Foreign Application Priority Data

Sep. 26, 2013 (JP) .................. 2013-199667
Sep. 26, 2013 (JP) .................. 2013-199668
Sep. 26, 2013 (JP) .................. 2013-199669

(51) Int. Cl.
*B42B 5/08* (2006.01)
*F16B 15/00* (2006.01)
(Continued)

(52) U.S. Cl.
CPC ................ *B42B 5/08* (2013.01); *B26F 1/02* (2013.01); *B31F 5/00* (2013.01); *B31F 5/06* (2013.01);
(Continued)

(58) Field of Classification Search
CPC . B65H 5/06; B65H 5/08; B65H 37/07; B65H 31/00; B65H 2801/27;
(Continued)

(56) References Cited

U.S. PATENT DOCUMENTS 4,431,127 A * 2/1984 Watanabe ............. B25B 31/005
227/76
6,918,580 B2 * 7/2005 Obregon ............... B25C 5/1689
227/2

(Continued)

FOREIGN PATENT DOCUMENTS

JP 2008044026 A * 2/2008

*Primary Examiner* — Leslie A Nicholson, III
(74) *Attorney, Agent, or Firm* — Manabu Kanesaka

(57) ABSTRACT

A paper-made staple binds a sheet bundle subjected to folding processing by a folding blade and a folding roller. The paper-made staple includes a pair of leg portions inserted into the sheet bundle and then bent inward; and a connection portion that connects the leg portions in a staple longitudinal direction. The connection portion has, at an edge portion thereof, a cut in a direction crossing the longitudinal direction so as to correspond to a predetermined folding position of the sheet bundle for the purpose of facilitating the folding of the connection portion, and the cut is formed inward from the edge portion so as to have a (Continued)

substantially triangular shape and is provided on both edge portions of the connection portion of the paper-made staple.

14 Claims, 20 Drawing Sheets

(51) Int. Cl.
*B65H 31/00* (2006.01)
*B26F 1/02* (2006.01)
*B31F 5/00* (2006.01)
*B42F 3/00* (2006.01)
*B42F 13/00* (2006.01)
*B31F 5/06* (2006.01)
*B42C 1/12* (2006.01)
*B65H 45/18* (2006.01)
*B65H 37/04* (2006.01)
*G03G 15/00* (2006.01)

(52) U.S. Cl.
CPC ............... *B42C 1/12* (2013.01); *B42F 3/003* (2013.01); *B42F 13/0093* (2013.01); *B65H 31/00* (2013.01); *B65H 37/04* (2013.01); *B65H 45/18* (2013.01); *F16B 15/0015* (2013.01); *G03G 15/6538* (2013.01); *G03G 15/6541* (2013.01); *B65H 2301/4213* (2013.01); *B65H 2301/42146* (2013.01); *B65H 2301/4505* (2013.01); *B65H 2408/123* (2013.01); *B65H 2701/1829* (2013.01); *B65H 2701/18292* (2013.01); *B65H 2801/27* (2013.01)

(58) Field of Classification Search
CPC ...... B65H 2301/4505; B26F 1/02; B31F 5/00; B31F 5/06; B42C 1/12; B42F 3/003; B42F 13/0093
USPC .. 270/37, 58.07, 58.08, 58.09, 58.12, 58.17; 412/33, 34, 38; 281/28
See application file for complete search history.

(56) References Cited

U.S. PATENT DOCUMENTS

| | | | | |
|---|---|---|---|---|
| 7,021,512 B1 * | 4/2006 | Nakamura | ................ | B25C 5/00 227/120 |
| 7,954,798 B2 * | 6/2011 | Taguchi | .................. | B26D 5/02 270/30.08 |
| 8,038,378 B2 * | 10/2011 | Aoki | ........................ | B42B 5/08 412/33 |
| 9,643,307 B2 * | 5/2017 | Kato | ..................... | B25C 5/0257 |
| 2014/0158738 A1 * | 6/2014 | Kato | ........................ | B25C 5/11 227/71 |

* cited by examiner

PAPER-MADE STAPLE AND PAPER-MADE STAPLE ASSEMBLY

CROSS-REFERENCE TO RELATED APPLICATION

This is a divisional application of Ser. No. 14/491,314 filed on Sep. 19, 2014 claiming priorities of Japanese Patent Applications No. 2013-199667 filed on Sep. 26, 2013, No. 2013-199668 filed on Sep. 26, 2013, and No. 2013-199669 filed on Sep. 26, 2013.

BACKGROUND OF THE INVENTION

1. Field of the Invention

The present invention relates to a sheet post-processing device that binds paper sheets carried out from an image forming device such as a printer or a copier and folds the bound paper sheets along a predetermined folding line and, more particularly, to a paper-made staple that binds the paper sheets.

2. Description of the Related Art

A sheet post-processing device that aligns paper sheets carried out from an image forming device and staples the paper sheets or folds the paper sheets in a booklet form is widely known. Such a sheet post-processing device is provided with a plurality of sheet accumulation means for sheet post-processing. For example, in a processing tray as a first sheet accumulation means, the paper sheets are accumulated in a bundle and are then stapled and, in a stacker section as a second sheet accumulation means, the paper sheets accumulated in a bundle are subjected to saddle stitching and then folded in a booklet form. In recent years, a binding processor that binds a paper sheet bundle without use of a metallic binding needle (metallic staple) in the sheet bundle binding processing and a sheet post-processing device are being provided.

For example, Jpn. Pat. Appln. Laid-Open Publication No. 2011-201698 discloses a device that performs bookbinding without use of a metallic binding staple so as to enhance recyclability and safety of the bound recording material bundle. In this device, a folding blade and a folding roller apply folding to a paper sheet bundle stacked on a stacker for stacking a plurality of paper sheets in order. A binding mechanism section binds the paper sheet bundle, without use of the metallic staple, in a position at a predetermined interval from a folding position where the paper sheet bundle is subjected to folding by the folding blade and the folding roller.

In the binding processing, the binding mechanism section causes deformation in a thickness direction of the paper sheet bundle that has been subjected to folding by the folding blade and the folding roller so as to bind the paper sheet bundle. More specifically, upper and lower concavo-convex teeth crimping teeth are meshed with each other to cause local deformation in the thickness direction of the paper sheet bundle to make the paper sheets to be engaged with each other.

Besides, there is known a cutter mechanism as a different type of binding mechanism from the binding mechanism using the crimping teeth. The cutter mechanism makes a cut in the paper sheet bundle for deformation of the cut part so as to bind the paper sheet bundle. More specifically, the cutter mechanism binds the paper sheet bundle by means of a U-shaped blade for making a U-shaped cut in the paper sheet bundle, a slit blade for forming a slit-like cut of a length corresponding to a width of the U-shaped blade, and a pushing-in means for pushing the U-shaped cut formed by the U-shaped blade in the slit-like cut.

In either of the above two mechanisms, a portion to which the binding mechanism applies binding is set so as to be separated by a predetermined interval from the folding position of the paper sheet bundle (refer to FIGS. 7 and 11 of Jpn. Pat. Appln. Laid-Open Publication No. 2011-201698). In other words, the folding position and binding position are shifted from each other.

Jpn. Pat. Appln. Laid-Open Publication No. 2013-126904 discloses a device including a cut forming section that forms a cut bent in a convex shape on one side of a paper sheet bundle and a binding portion forming section that forms, inside a range surrounded by the convex-shaped cut, a binding portion for binding the paper sheet bundle, wherein a line connecting both end portions of the convex-shaped cut is set as a folding line along which the paper sheet bundle is folded in two.

To be more specific, the above configuration is realized by a press device. The press device is provided with a punch section and a die section and configured to apply punching to the paper sheet bundle by the punch section. The punch section has an engagement piece forming blade, a hole forming blade, and a cut forming blade (FIG. 5). The engagement piece forming blade makes a cut in the paper sheet blade to form an engagement piece in the paper sheet. The hole forming blade forms, in the paper sheet, a locking piece which is a hole through which the engagement piece is inserted. The cut forming blade forms a cut in the paper sheet. The cut forming blade is bent (curved) into a shape protruding to one side. Both end portions of the engagement piece forming blade and both end portions of the cut forming blade are positioned on the same straight line. The paper sheet bundle is conveyed such that the folding line of the sheet bundle coincides with the straight line. On the other hand, the die section has a first insertion hole into which the engagement piece forming blade is inserted, a second insertion hole into which the hole forming blade is inserted, and a third insertion hole into which the cut forming blade is inserted.

Thus, the both end portions of the engagement piece forming blade and both end portions of the cut forming blade are positioned on the same straight line, and the folding line is set on this straight line. That is, as in Jpn. Pat. Appln. Laid-Open Publication No. 2011-201698, the folding position and binding position are shifted from each other.

Japanese Patent No. 4,952,129 discloses a stapler device that uses a paper-made staple in place of a metallic staple in consideration of environment and safety. In this device, an operator manually inserts a paper sheet bundle into a binding processing port. More specifically, Japanese Patent No. 4,952,129 discloses a desk-top type stapler device. In this device, a paper-made staple at the top of a connected staple in which a plurality of substantially straight shaped paper-made staple are connected in parallel is cut off from the connected staple and shaped into a substantially U-form. Then, both leg portions of the paper-made staple are made to penetrate paper sheets to be bound, bent along the paper sheets to be bound, and then bonded to each other. With this configuration, it is possible to bind the paper sheets to be bound with an easily deformable paper-made staple.

All of the above disclosed inventions are devices that bind the paper sheet bundle at a middle portion thereof and have a configuration in which the folding position and binding position are shifted from each other. The invention disclosed in Japanese Patent No. 4,952,129 is a device that does not use a metallic staple but uses a paper-made staple to bind the paper sheet bundle.

When the binding processing and folding processing are performed without use of the metallic staple in the above sheet post-processing devices that align paper sheets carried out from an image forming device or the like and staples the paper sheets or folds the paper sheets in a booklet form, the following problems arise in terms of device configuration.

As disclosed in Jpn. Pat. Appln. Laid-Open Publications No. 2011-201698 and No. 2013-126904, a portion to which the binding mechanism applies binding is set so as to be separated by a predetermined interval from the folding position of the paper sheet bundle. In other words, a booklet is formed with the folding position and binding position shifted from each other. However, as compared with a configuration in which a stapler position (binding position) and folding position are set at substantially the same position, a page opening range differs between a page where the binding position is formed and a page where the binding position is not formed due to shifting of the binding position from the folding position.

Thus, unless a printing area is reduced for the page having the binding position, image missing may occur. Further, when the folding position is set at a half position of a length of the paper sheet, since the binding position is shifted from the folding position, the first half pages can be turned beyond the folding position, whereas the remaining half pages can be turned only to the binding position separated away from the folding position. Thus, unbalance is generated in the page opening range in the same booklet, causing a feeling of strangeness.

The binding mechanisms disclosed in Jpn. Pat. Appln. Laid-Open Publications No. 2011-201698 and No. 2013-126904 are each configured to bind the paper sheet bundle by deforming the paper sheets themselves. For example, upper and lower concavo-convex teeth crimping teeth are meshed with each other to cause the deformation in the thickness direction of the paper sheet bundle to make the paper sheets to be engaged with each other. However, it is necessary to mesh the upper and lower concavo-convex crimping teeth with a considerable crimping force in order to make the paper sheets to be engaged with each other. An insufficient crimping force results in insufficient binding, that is, only the crimping force cannot make the binding state staple. When the binding position is made to coincide with the folding position in the binding mechanism using this crimping mechanism, a deformation force due to curve of the paper sheets acts to affect binding performance.

Further, as another binding mechanism, there is known the mechanism including a cut forming section that forms a cut bent in a convex shape on one side of a paper sheet bundle and a binding portion forming section that forms, inside a range surrounded by the convex-shaped cut, a binding portion for binding the paper sheet bundle, wherein the convex-shaped cut is inserted into the binding portion for binding. In this case, a comparatively large cut is formed in the paper sheets themselves, so that damage is given to the paper sheets themselves, and outer appearance is affected.

Under such circumstances, the binding mechanism by the paper-made staple as disclosed in Japanese Patent No. 4,952,129 that binds the paper sheet bundle without use of the crimping mechanism or without forming large cut in the paper sheets can be considered effective. However, in this mechanism, the operator manually inserts an end edge of the paper sheet bundle into a binding processing port, and the configuration described above, in which the paper sheet bundle is folded at the half position of the paper sheet length and bound is not considered at all. As a matter of course, a configuration in which the binding position of the paper sheet bundle and folding position are set at substantially the same position is not described.

Under such circumstances, the present inventor examines a configuration in which the paper-made staple is used to bind the paper sheet bundle at the half position of the paper sheet length and seeks to provide a sheet post-processing device capable of demonstrating a comparatively large binding force, capable of allowing left and right pages to be opened evenly upon page turning, capable of using the paper-made staple in the same way as the metallic one, and capable of providing an environmental benefit, and an image forming device adopting the sheet post-processing device.

SUMMARY OF THE INVENTION

To solve the above problem, according to a first aspect of the present invention, there is provided a paper-made staple to bind a sheet bundle and subjected to folding processing by a folding blade and a folding roller, together with the sheet bundle bound with the paper-made staple, the paper-made staple comprising: a pair of leg portions inserted into the sheet bundle and then bent inward; and a connection portion that connects the leg portions in a staple longitudinal direction, wherein the connection portion has, at an edge portion thereof, a cut in a direction crossing the longitudinal direction so as to correspond to a predetermined folding position of the sheet bundle for the purpose of facilitating the folding of the connection portion.

According to a second aspect of the present invention, there is provided a paper-made staple to bind a sheet bundle and subjected to folding processing by a folding blade and a folding roller, together with the sheet bundle bound with the paper-made staple, the paper-made staple comprising: a pair of leg portions inserted into the sheet bundle and then bent inward; and a connection portion that connects the leg portions in a staple longitudinal direction, wherein the connection portion has a connection portion cut in a direction crossing the longitudinal direction so as to correspond to a predetermined folding position for the purpose of facilitating the folding thereof, and each of the leg portions has a leg portion side cut at a position overlapping the cut of the connection portion when the leg portions are bent inward.

According to the first aspect of the present invention, the cut is formed inward from the edge portion so as to have a substantially triangular shape and is provided on both edge portions of the connection portion of the paper-made staple.

According to the second aspect of the present invention, a width of the leg portion side cut in the longitudinal direction of the paper-made staple is set larger than a width of the connection portion cut in the longitudinal direction.

With the above technical features, the staple itself of the present invention is easily and reliably folded along the cut, facilitating the folding of the paper-made staple.

BRIEF DESCRIPTION OF THE DRAWINGS

FIGS. 12A to 12C are explanatory views each illustrating the paper-made staple loaded into the saddle stitching stapler of the present invention, in which FIG. 12A is an explanatory view illustrating a state where a plurality of the paper-made staples are connected, FIG. 12B is a perspective view of the paper-made staple, and FIG. 12C is a cross-sectional view illustrating a state where the paper sheet bundle is bound with the paper-made staple;

FIGS. 14A and 14B illustrate another embodiment of the paper-made staple to be applied to the sheet to be bound, in which FIG. 14A is an explanatory view illustrating a connected state of the paper-made staples, and FIG. 14B is a cross-sectional view illustrating a state where the paper sheet bundle is bound with the paper-made staple;

FIGS. 15A to 15D are explanatory views of operation of the sheet bundle folding unit illustrated in FIGS. 2 and 4, in which FIG. 15A is a view illustrating a state where the paper sheet bundle bound with the paper-made staple is set at the folding position, FIG. 15B is an initial state view of operation of folding the paper sheet bundle and paper-made staple from a leg portion side, FIG. 15C is a view illustrating a state where the paper sheet bundle and paper-made staple are inserted into a nip position between folding rollers, and FIG. 15D is a carry-out state view where the paper sheet bundle and paper-made staple are folded by the folding rollers;

FIGS. 19A and 19B are explanatory views each illustrating a positional relationship between the paper-made staple and folding blade, in which FIG. 19A is a view illustrating a state where the leg portions of the paper-made staple overlap each other at an abutting position of the folding blade, and FIG. 19B is a view illustrating a state where the leg portions of the paper-made staple do not overlap each other at the abutting position of the folding blade.

DESCRIPTION OF THE PREFERRED EMBODIMENTS

Figure 1:
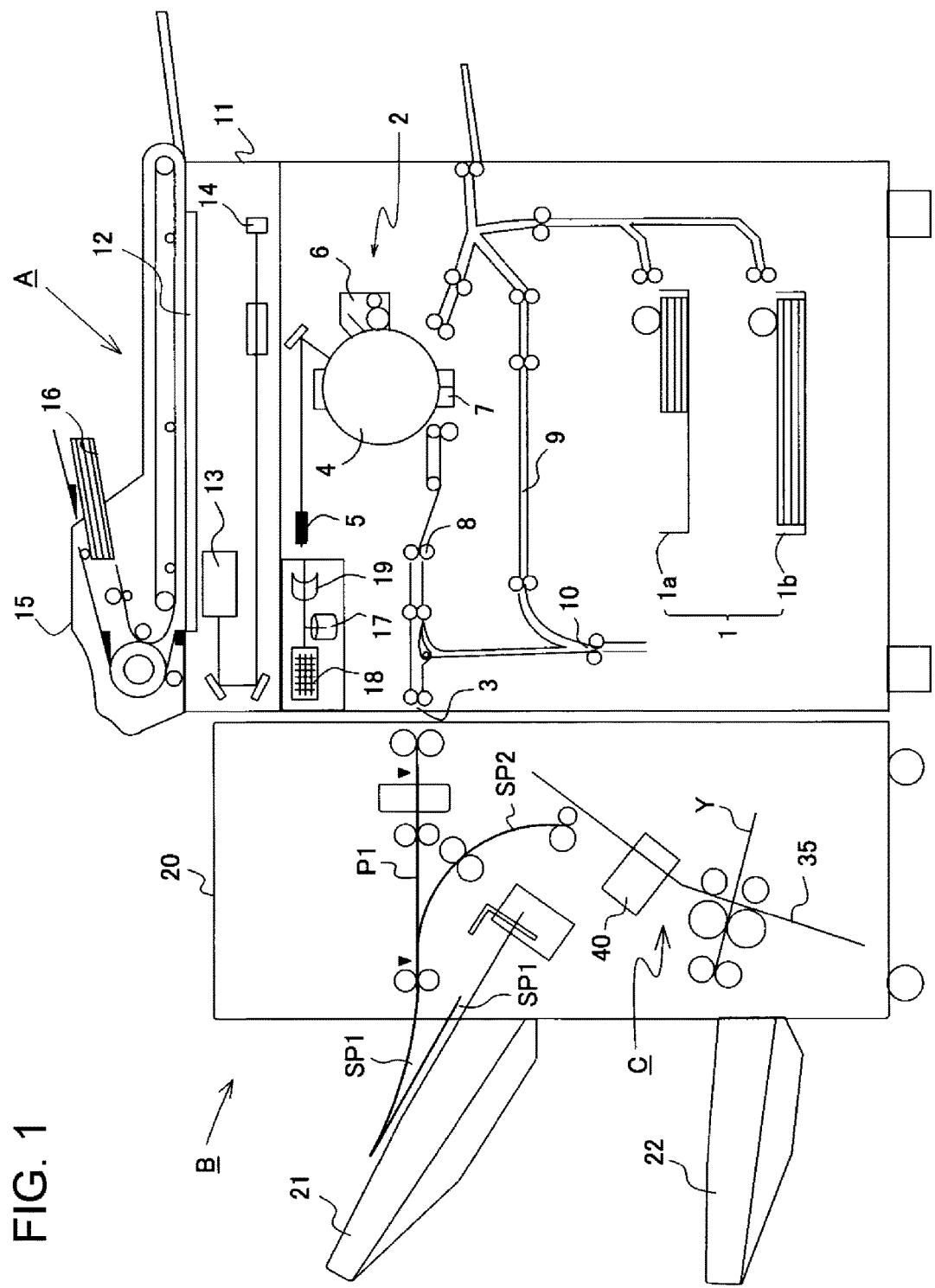
FIG. 1 is an explanatory view illustrating an entire configuration of an image forming system according to the present invention.
Figure 2:
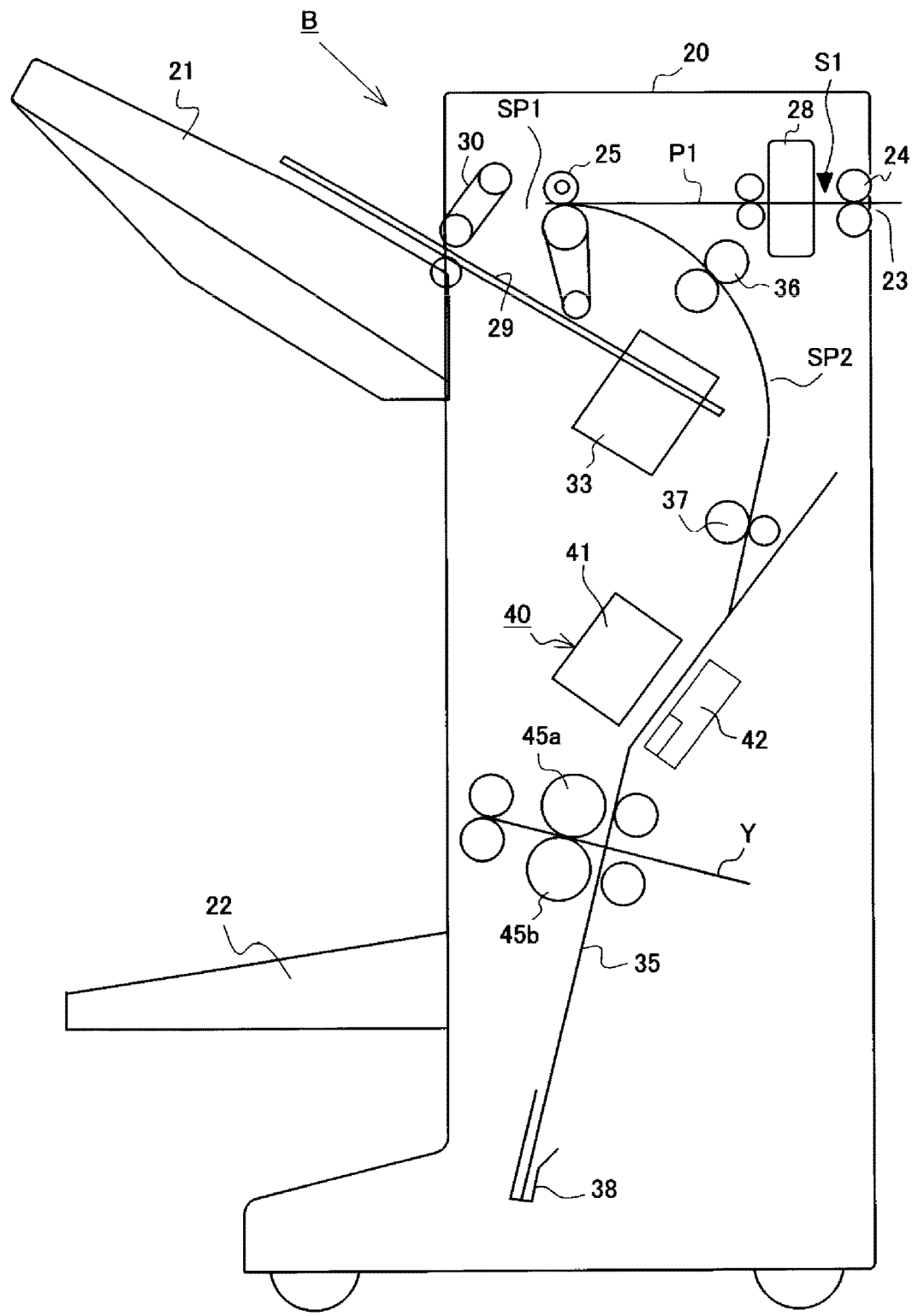
FIG. 2 is an explanatory view illustrating an entire configuration of a sheet post-processing device according to the present invention provided with a sheet folding unit.
Figure 3:
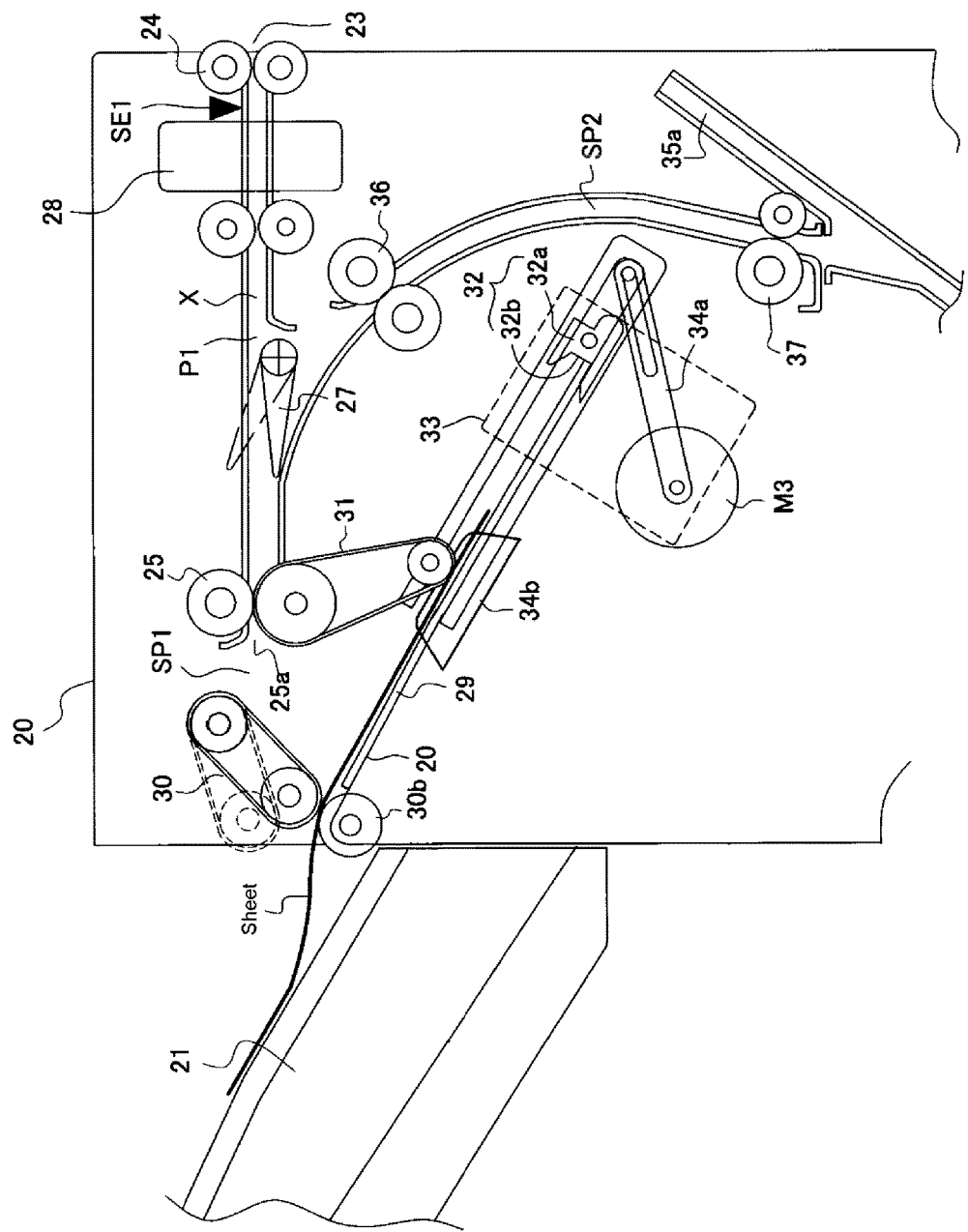
FIG. 3 is an explanatory view illustrating a part of the sheet folding unit of FIG. 2.

Hereinafter, the present invention will be described based on a preferred embodiment illustrated. FIG. 1 is an explanatory view illustrating an entire configuration of an image forming system according to the present invention, FIG. 2 is an explanatory view illustrating an entire configuration of a sheet post-processing device, and FIG. 3 is an explanatory view illustrating a detailed configuration of a sheet folding unit. The image forming system illustrated in FIG. 1 includes an image forming device A and a sheet post-processing device B, and the sheet post-processing device B incorporates a sheet saddle stitching device C.

[Configuration of Image Forming Device]

The image forming device A illustrated in FIG. 1 feeds a paper sheet from a sheet supply section 1, performs printing in an image forming section 2, and discharges the paper sheet after printing from a main body discharge port 3. Paper sheets of a plurality of sizes are accommodated in sheet cassettes 1a and 1b, and the sheet supply section separates, one from the other, paper sheets of a specified size and feeds them one by one to the image forming section 2. The image forming section 2 includes an electrostatic drum 4 and a print head (laser emitter) 5, a developing unit 6, a transfer charger 7, and a fixing unit 8 which are disposed around the electrostatic drum 4. An electrostatic latent image is formed on the electrostatic drum 4 using the laser emitter 5, the developing unit 6 adds toner to the image, the transfer charger 7 transfers the image onto the paper sheet, and the fixing unit 8 thermally-fixes the image. The paper sheet with thus formed image is sequentially carried out from the main body discharge port 3. A reference numeral 9 in FIG. 1 denotes a circulation path, which is a path for two-side printing in which the paper sheet printed on the front side from the fixing unit 8 is reversed via a main body switchback path and is fed to the image forming section 2 again for printing on the back side of the paper sheet. The paper sheet thus printed on both sides is reversed in the main body switchback path 10 and is carried out from the main body discharge port 3.

A reference numeral 11 in FIG. 1 denotes an image reader, where a document sheet set on a platen 12 is scanned by a scan unit 13 and is electrically read by a photoelectric conversion element 14 through a reflective mirror and a condensing lens. This image data is subjected to, e.g., digital processing by an image processor and is subsequently transferred to a data storage section 17, and an image signal is sent to the laser emitter 5. A reference numeral 15 denotes a document feeder that feeds document sheets stored in a stacker 16 to the platen 12.

The image forming device A having the above-described configuration is provided with a control section (controller). Image forming conditions are set via a controller panel 18, for example, printout conditions such as a sheet size specification, a color or black-and-white printing specification, a print copy count specification, single- or double-side printing specification, and enlarged or reduced printing specification. On the other hand, in the image forming device A, image data read by the scan unit 13 or transferred through an external network is stored in the data storage section 17. The image data stored in the data storage section 17 is transferred to a buffer memory 19, which sequentially transfers data signals to the laser emitter 5.

Simultaneously with the image forming conditions, post-processing conditions are input and specified via the controller panel 18. For example, a "printout mode", a "stapling mode", and a "sheet bundle folding mode" are specified as the post-processing conditions. The image forming device A forms an image on the paper sheet in accordance with the image forming conditions and the post-processing conditions.

[Configuration of Sheet Post-Processing Device]

The sheet post-processing device B connected to the above-described image forming device A receives a paper sheet with the image formed thereon from the main body discharge port 3 of the image forming device A and is configured to (1) store the paper sheet in a first sheet discharge tray 21 ("printout mode" as described above), (2) align the paper sheets from the main body discharge port 3 in a bundle to staple them and then store the paper sheets in the first sheet discharge tray 21 ("stapling mode" as described above), or (3) align the paper sheets from the main body discharge port 3 in a bundle, then fold the paper sheets in a booklet form, and store the paper sheets in a second discharge tray 22 ("sheet bundle folding mode" as described above).

Thus, as illustrated in FIG. 2, the sheet post-processing device B is provided with the first sheet discharge tray 21 and second sheet discharge tray 22 in a casing 20. Further, the device B is provided with a sheet carry-in path P1 having a carry-in port 23 continued to the main body discharge port 3. The sheet carry-in path P1 is formed of a straight-line path in a substantially horizontal direction in the casing 20. Further, there are provided a first switchback conveying path SP1 and a second switchback conveying path SP2 that branch off from the sheet carry-in path P1 to transport a paper sheet in an inverse direction. The first switchback conveying path SP1 branches off from the sheet carry-in path P1 to the downstream side of the sheet carry-in path P1, the second switchback conveying path SP2 branches off from the sheet carry-in path P1 to the upstream side of the sheet carry-in path P1, and the paths SP1 and SP2 are disposed spaced apart from each other.

In such a path configuration, in the sheet carry-in path P1, there are disposed a carry-in roller 24 and sheet discharge roller 25, and the rollers are coupled to a drive motor M1 (see FIG. 20) capable of rotating forward and backward. Further, in the sheet carry-in path P1, there is disposed a path switching piece 27 for guiding a paper sheet to the second switchback conveying path SP2, and the piece 27 is coupled to an operation means such as a solenoid. Further, the sheet carry-in path P1 has, on the downstream side of the carry-in roller 24, a punch device 28 for punching the paper sheet from the carry-in port 23. The illustrated punch device 28 is configured to be detachably mounted to the casing 20 depending on a device specification.

[Configuration of First Switchback Conveying Path SP1]

The first switchback conveying path SP1 disposed, as illustrated in detail in FIGS. 2 and 3, on the downstream side (rear end portion of the device) of the sheet carry-in path P1 is configured as described below. The sheet carry-in path P1 is provided, at its exit end, with the sheet discharge roller 25 and a sheet discharge port 25a. A level difference is formed from the sheet discharge port 25a, and a processing tray 29 constituting a first processing tray is provided on the downstream side. The processing tray 29 includes a tray for loading and supporting the paper sheet discharged from the sheet discharge port 25a. There is disposed, above the processing tray 29, a forward/backward rotation roller 30 capable of moving up and down between a position to come into contact with the paper sheet on the tray and a standby position (chain-line position in FIG. 3) spaced apart from the contact position. The forward/backward rotation roller 30 is coupled with a forward/backward rotation motor M2 (see FIG. 20) and is controlled to rotate in a clockwise direction in FIG. 3 when a paper sheet approaches the processing tray 29, while rotating in a counterclockwise direction after a paper sheet rear end enters the tray. Thus, the first switchback conveying path SP1 is configured above the processing tray 29. A reference numeral 31 in FIG. 3 denotes a caterpillar belt, and its one pulley side is brought into press-contact with the sheet discharge roller 25. The caterpillar belt 31 is axially supported so as to be pivotable about a shaft on the one pulley side so that a leading end pulley side droops onto the processing tray 29. A reference numeral 30b in FIG. 3 denotes a driven roller engaged with the forward/backward rotation roller 30. The driven roller 30b is provided in the processing tray 29.

Further, the first sheet discharge tray 21 is located downstream of the first switchback conveying path SP1 and is configured to support a leading end of paper sheet guided to the first switchback conveying path SP1 and second switchback conveying path SP2.

With the above-described configuration, the paper sheet from the sheet discharge port 25a reaches the processing tray 29 and is transferred toward the first sheet discharge tray 21 by the forward/backward rotation roller 30. Once the rear end of the paper sheet reaches the processing tray 29, the forward/backward rotation roller 30 is reversely rotated (counterclockwise in the figure) to transfer the paper sheet on the processing tray 29 in a direction opposite to a sheet discharge direction. At this time, the caterpillar belt 31 cooperates with the forward/backward rotation roller 30 to switchback-convey the rear end of the paper sheet along the processing tray 29.

A rear end regulating member 32 and an end surface stapler 33 are disposed at a rear end portion of the processing tray 29 in the sheet discharge direction. The rear end regulating member 32 regulates a position of the rear end of the paper sheet. The illustrated end surface stapler 33 staples a paper sheet bundle collected on the tray at one or more positions. The rear end regulating member 32 is also used to provide a function of carrying out the stapled paper sheet bundle to the first sheet discharge tray 21, located downstream of the processing tray 29. To this end, the rear end regulating member 32 is configured to be able to reciprocate in the sheet discharge direction along the processing tray 29. A carry-out mechanism of the illustrated rear end regulating member 32 has a grip pawl that grips the paper sheet bundle and a rear end regulating surface 32b against which the sheet rear end abuts for regulation. The rear end regulating member 32 is configured to be movable in the left-right direction in the figure along a guide rail provided on a device frame. A reference numeral 34a denotes a driving arm that reciprocates the rear end regulating member 32. The driving arm 34 is coupled to a sheet discharge motor M3 (see FIG. 20).

The processing tray 29 has a side aligning plate 34b with which the paper sheets collected on the tray are aligned in a width direction thereof. The side aligning plate 34b includes a pair of left and right (front and rear in FIG. 3) aligning plates so as to align the paper sheets with reference to a sheet center and is configured to approach and leave the sheet center. The side aligning plate 34b is coupled to a not illustrated aligning motor.

The first switchback conveying path SP1 configured as described above aligns the paper sheets from the sheet discharge port 25a on the processing tray 29 in the "stapling mode" as described above, and the end surface stapler 33 staples the paper sheet bundle at one or more portions of the rear end edge of this paper sheet bundle. In the "printout mode", a sheet from the sheet discharge port 25a is not subjected to the switchback, but the sheet conveyed along the processing tray 29 is made to pass between the forward/backward rotation roller 30 and driven roller 30b and carried out to the first sheet discharge tray 21. Thus, the illustrated device is characterized in that the sheet to be stapled is bridged between the processing tray 29 and the first sheet discharge tray 21 to allow the device to be compactly configured.

[Configuration of Second Switchback Conveying Path SP2]

Figure 4:
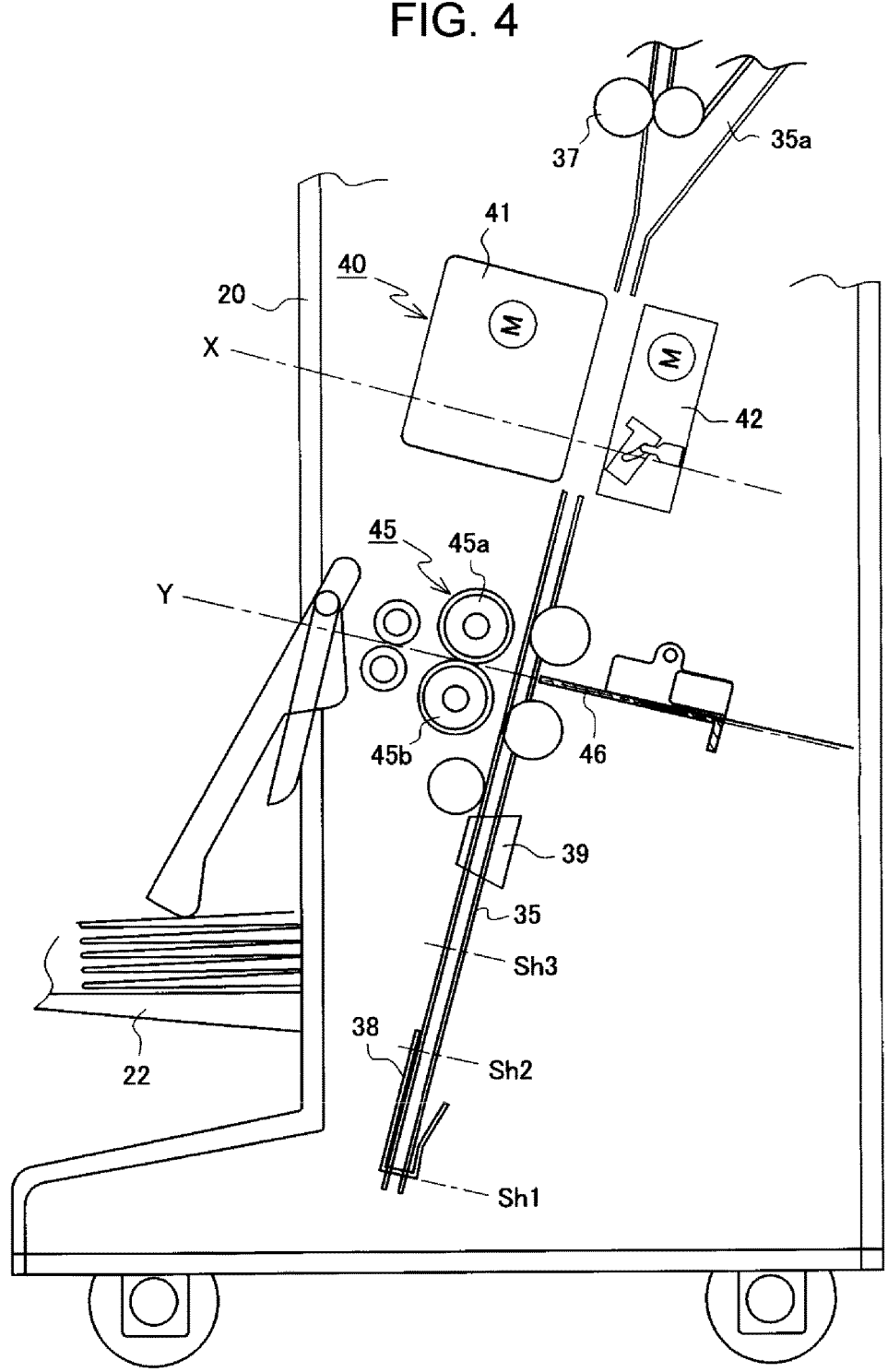
FIG. 4 is an explanatory view of the sheet folding unit.

The following describes a configuration of the second switchback conveying path SP2 branching off from the sheet carry-in path P1. As illustrated in FIG. 4, the second switchback conveying path SP2 is located in a substantially vertical direction inside the casing 20. A conveying roller 36 is located at an inlet of the second switchback conveying path SP2, and a conveying roller 37 is located at an outlet of the second switchback conveying path SP2. A stacker section 35 constituting a second processing tray that aligns and temporarily collects the paper sheets fed along the second switchback conveying path SP2 is provided downstream of the second switchback conveying path SP2. The illustrated stacker section 35 includes a conveying guide that transfers the paper sheets. A saddle stitching stapler 40 and folding roller 45 are arranged along the stacker section 35. The configuration of these components will be sequentially described below.

The conveying roller 36, located at the inlet of the second switchback conveying path SP2, is configured to be rotatable forward and backward. A sheet carried into the first switchback conveying path SP1 located downstream is temporarily held (temporarily reside) on the second switchback conveying path SP2. The reason for the temporary holding is as follows. That is, the preceding paper sheets are stapled by the end surface stapler 33, and the resultant sheet bundle is carried out to the first sheet discharge tray 21. During this carry-out, a paper sheet fed from the image forming device A to the sheet carry-in path P1 is temporarily held on the second switchback conveying path SP2. Then, after the processing of the preceding paper sheet bundle is finished, the standing-by sheet is conveyed from the first switchback conveying path SP1 onto the processing tray 29.

The stacker section 35 is formed of a guide member that guides the paper sheet being conveyed. The stacker section 35 is configured so that the paper sheets are loaded and housed thereon. The illustrated stacker section 35 is connected to the second switchback conveying path SP2 and located in a center portion of the casing 20 so as to extend in the substantially vertical direction. This allows the device to be compactly configured. The stacker section 35 is shaped to have an appropriate size to house maximum sized paper sheets. In particular, the illustrated stacker section 35 is curved or bent so as to project toward the area in which the saddle stitching stapler 40 and folding roller 45 to be described later are arranged.

A switchback approaching path 35a is connected to a conveying direction rear end of the stacker section 35. The switchback approaching path 35a overlaps the outlet end of the second switchback conveying path SP2. This is to allow the rear end of a carried-in (succeeding) paper sheet fed from the conveying roller 37 on the second switchback conveying path SP2 to overlap the rear end of the loaded (preceding) paper sheets supported on the stacker section 35 to ensure the page order of the collected paper sheets. A leading end regulating member (hereinafter, referred to as stopper 38) regulating a sheet leading end in the conveying direction is located downstream of the stacker section 35. The stopper 38 is supported by a guide rail and the like so as to be movable along the stacker section 35. The stopper 38 is moved between positions Sh1 and Sh2 and Sh3, illustrated in the figure, by a shift means control circuit MS (see FIG. 20). This point will be described later in connection with a controller of the stopper 38.

[Configuration of Saddle Stitching Stapler]

The following describes the saddle stitching stapler 40 with reference to FIGS. 5 to 11. As illustrated in FIG. 4, a binding position X and a folding position Y are set at the upstream side and downstream side, respectively, along the above-described stacker section 35. The saddle stitching stapler 40 that binds the sheet bundle with a paper-made staple 60 is disposed at the binding position X. The saddle stitching stapler 40 includes a driver unit 41 and a clincher unit 42 which are arranged opposite to each other across the stacker section 35. The driver unit 41 drives a paper-made staple 60 into a paper sheet bundle 100. The clincher unit 42 bends leg portions 61 and 62 of the driven paper-made staple 60 in a direction facing each other and bonds the leg portions 61 and 62 to each other. The driver unit 41 and clincher unit 42 face each other across the stacker section 35.

Figure 9:
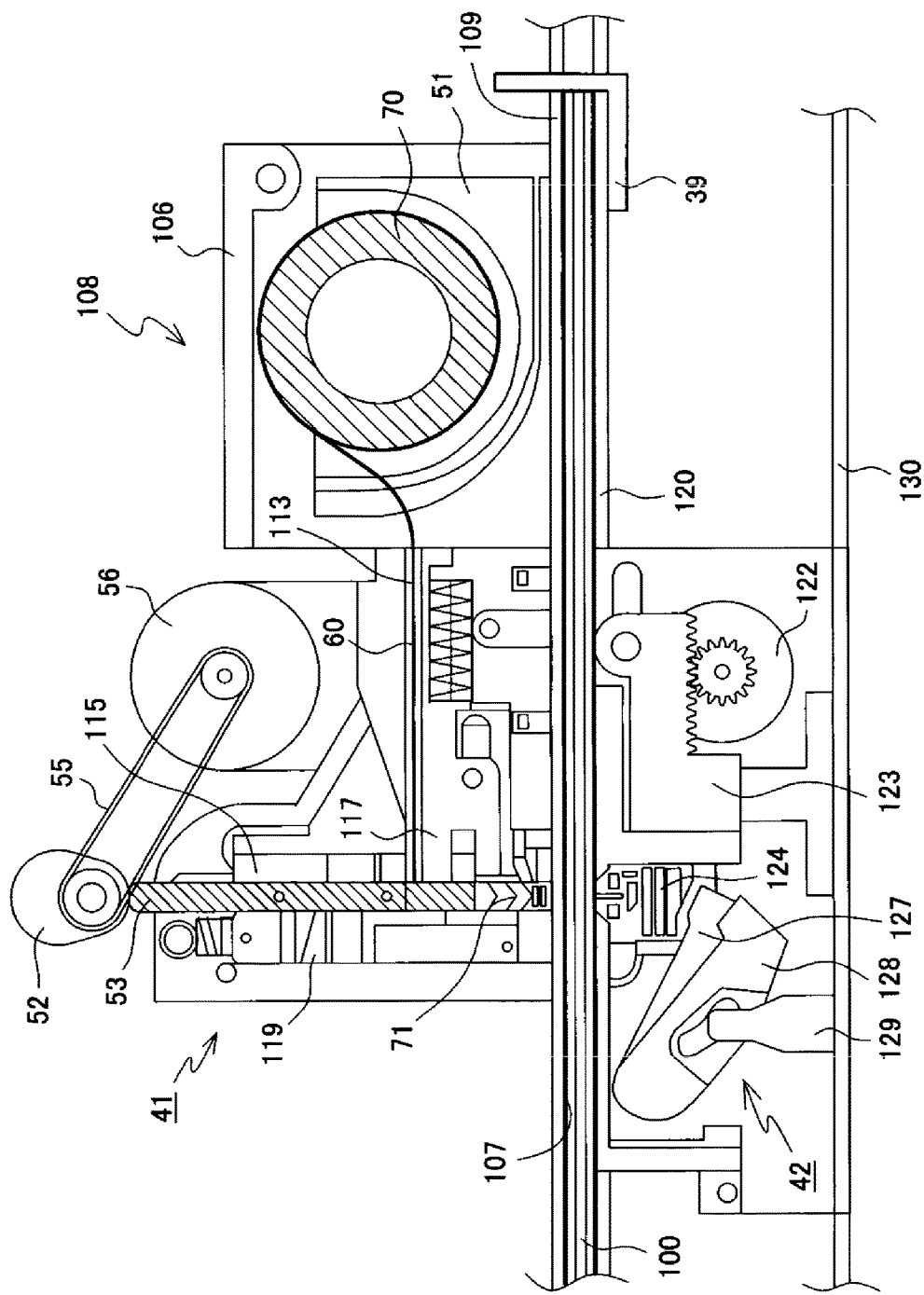
FIG. 9 is an explanatory view illustrating a saddle stitching stapler (separated type) of the sheet post-processing device of FIG. 4.
Figure 10:
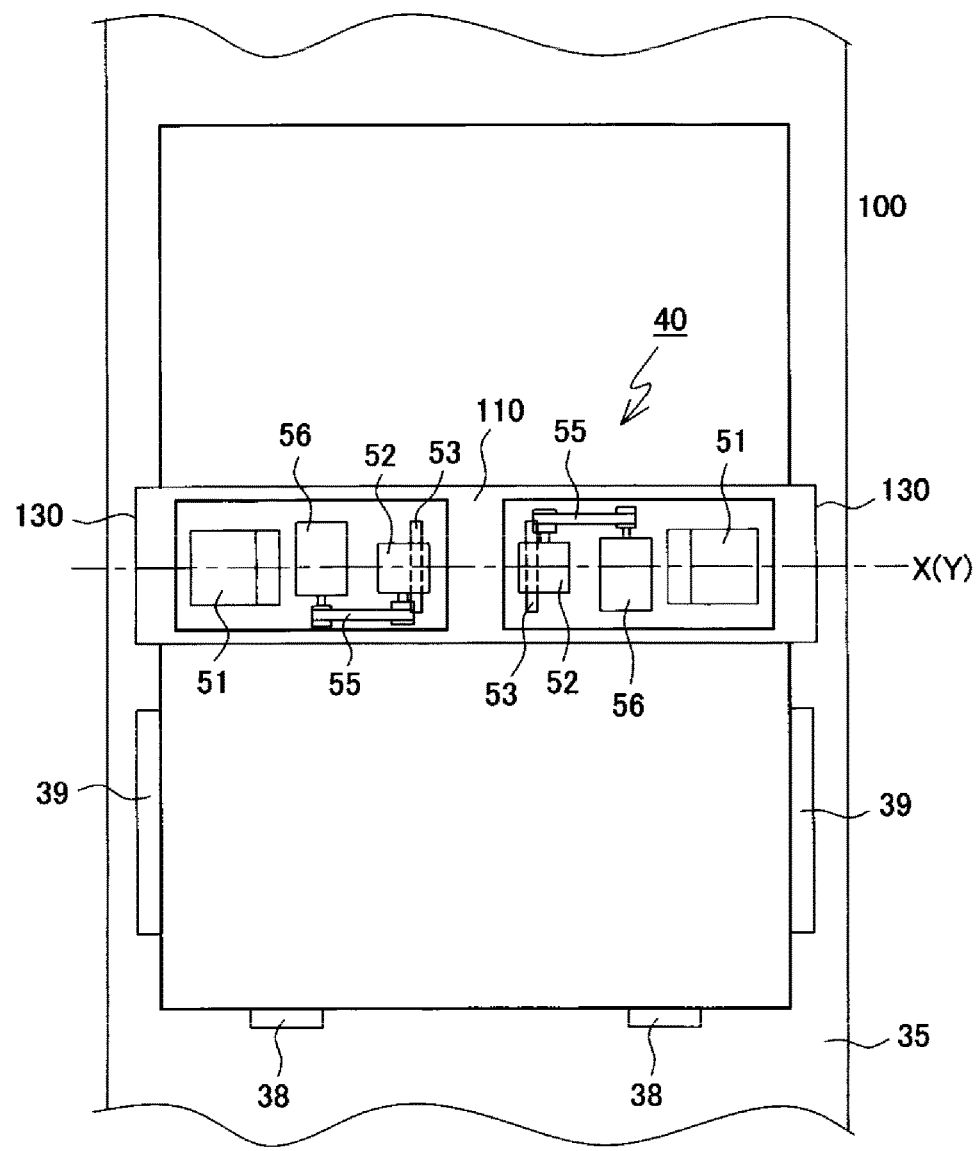
FIG. 10 is a view illustrating a state where the saddle stitching staplers of FIG. 9 are mounted to the stacker.
Figure 11:
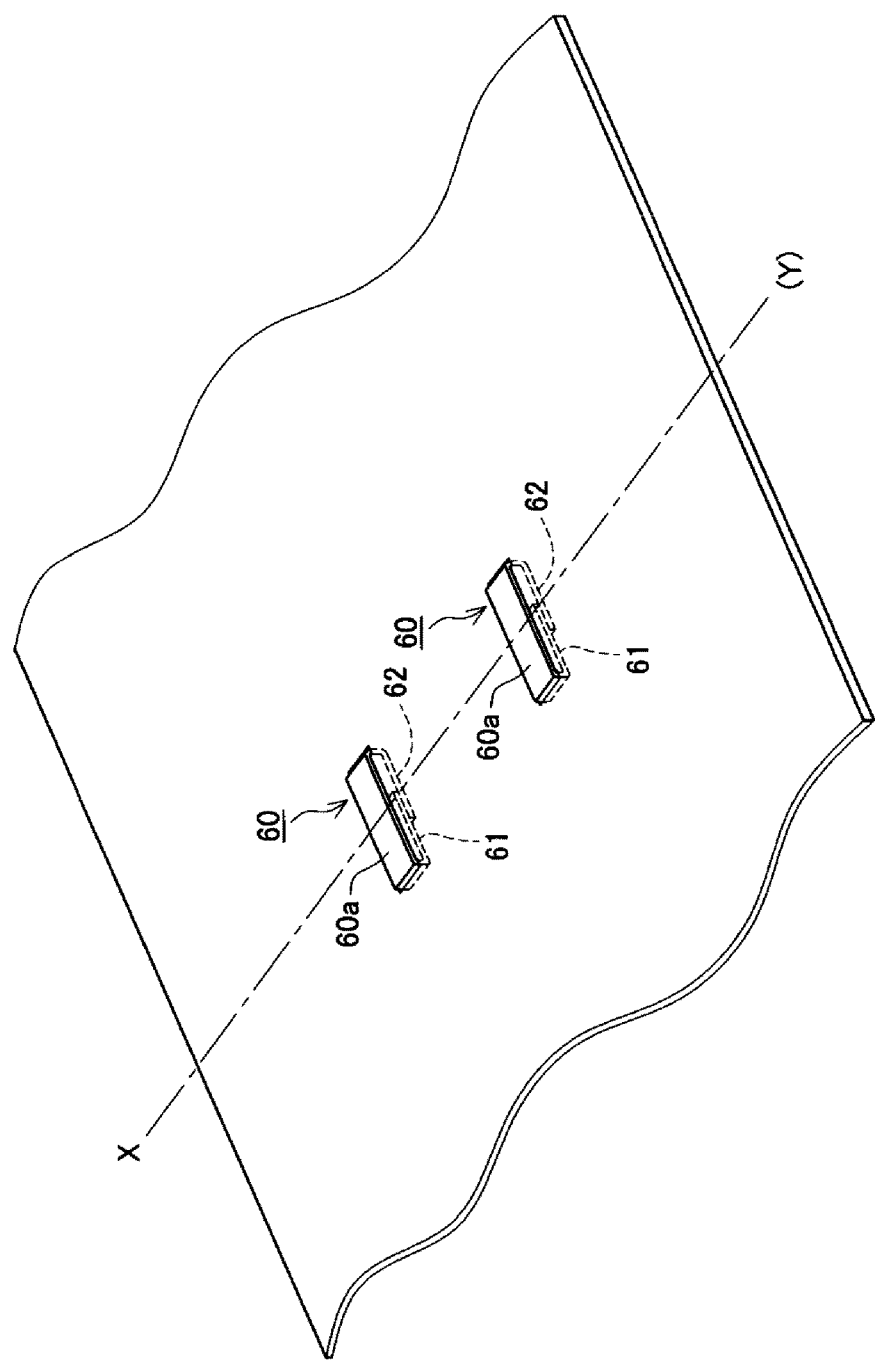
FIG. 11 is an explanatory view illustrating a state where the paper sheet bundle is bound at a position straddling the folding position of the paper sheet bundle by the saddle stitching stapler of FIG. 9.

The saddle stitching stapler 40 illustrated in FIGS. 5 to 8 is of a non-separated type in which the driver unit 41 and clincher unit 42 are integrally formed with a frame 108 and not separated from each other, while the saddle stitching stapler 40 illustrated in FIGS. 9 to 11 is of a separated type in which the driver unit 41 and clincher unit 42 are separated up and down.

Figure 12A:
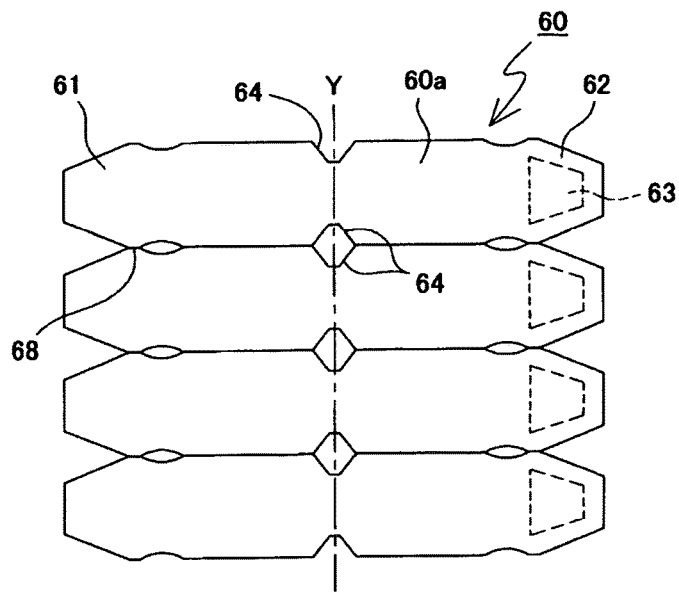
Figure 12B:
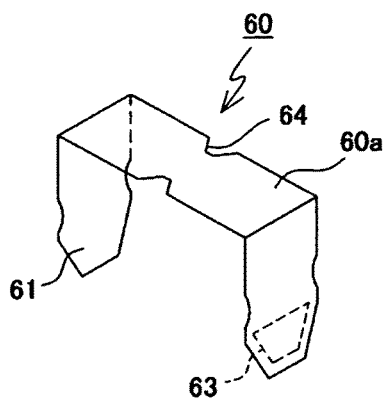
Figure 12C:
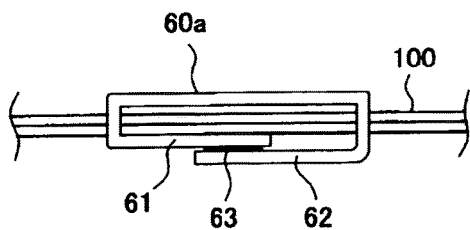
Figure 13:
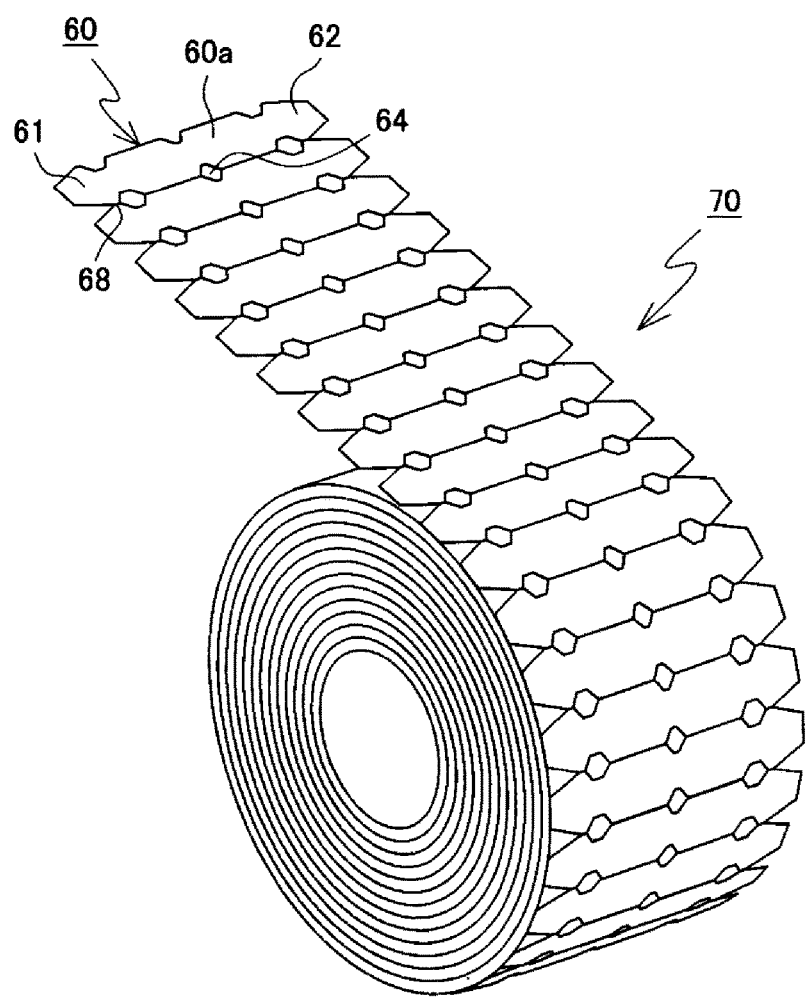
FIG. 13 is an explanatory view illustrating a state where a number of paper-made staples are wound in a roll shape.

FIGS. 12 to 14, to be described later, illustrate a configuration of the paper-made staple 60 loaded into the saddle stitching stapler 40 and binds the paper sheet bundle. The paper-made staple 60 referred to in the present application is a paper-made staple needle for binding the paper sheet bundle. The paper-made staple need not be fully made of paper, but a material of the paper-made staple may be a thin plastic material or the like as long as it has flexibility equivalent to the paper and environmental protection property (e.g., capable of being discarded without being classified from papers).

Figure 5:
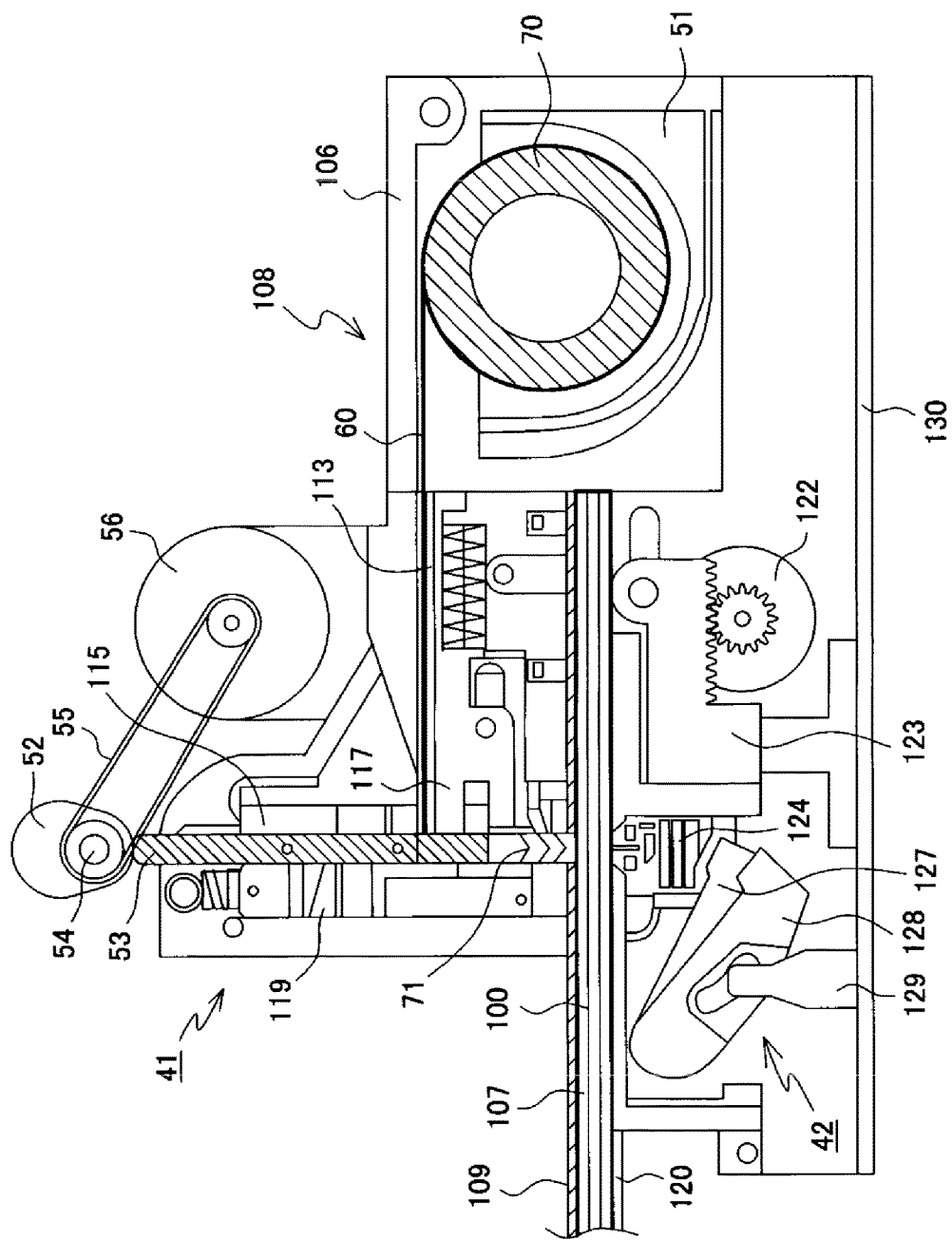
FIG. 5 is an explanatory view illustrating a saddle stitching stapler (non-separated type) of the sheet post-processing device of FIG. 4.

First, an overview of the saddle stitching stapler of a non-separated type illustrated in FIGS. 5 to 8 will be described. As illustrated in FIG. 5, the saddle stitching stapler 40 includes a frame 108 and a base 109. The frame 108 has a sheet insertion port 107 positioned below a drive motor 56 that performs staple drive when the saddle stitching stapler 40 performs binding operation with the paper-made staple 60, through which paper sheets to be bound are inserted. The base 109 supports the drive motor 56 and frame 108.

As illustrated in FIG. 5, the drive motor 56 is rotatably mounted to an upper portion of the frame 108. The drive motor 56 rotates a driver cam 52 when performing the binding operation. When a rolled staple 70 in which a number of paper-made staples 60 are connected is loaded into a staple holder 111 (to be described later) of the frame 108, a staple cover 106 positioned to the left of the drive motor 56 is released to open an upper surface of the frame 108.

The frame 108 has, at its rear end portion, a staple cartridge 51 as a staple loading section for loading the rolled staple 70. The frame 108 further has a substantially planar conveying path 113 as a staple conveying path for conveying the paper-made staple 60 frontward from the staple holder 111. Although not illustrated, a plate spring is provided on both left and right sides of the conveying path 113.

The frame 108 has, near a front end portion of the conveying path 113, the drive motor 56 that rotates the driver cam 52. Further, the frame 108 has, below the driver cam 52, a forming plate 115 as a staple cutting/shaping section for cutting the paper-made staple and shaping it into a substantially U-shape. The forming plate 115 performs cutting and shaping of the paper-made staple 60. The frame 108 further has a driver unit 41 as a staple penetrating section for making the paper-made staple 60 penetrate the paper sheets to be bound by the drive of the drive motor 56. The driver unit 41 has a driver 53 that moves up and down a cutter blade 71 for forming a hole penetrating the paper sheets. The frame 108 further has a sheet presser 119 for pressing the paper sheet to be bundled upon cutting, shaping, and penetration.

The frame 108 further has, below the conveying path 113, a pusher 117 biased frontward by a spring, as a moving mechanism for moving the paper-made staple 60 from a position at which the above-described cutting and shaping of the paper-made staple 60 is performed to a position at which the penetration of the paper-made staple 60 into the paper sheet bundle 100 is performed. There is provided, below the forming plate 115, driver 53, sheet presser 119, and pusher 117, a sheet insertion port 107 through which the sheet bundle to be bound and a table 120 on which the sheet bundle to be bound is placed.

There is provided, below the table 120, a bending section that bends, along the paper sheet bundle 100, the leg portions 61 and 62 of the driven paper-made staple 60 that has penetrated the paper sheet bundle 100 at the penetration position and bonds the leg portions 61 and 62 to each other. The saddle stitching stapler 40 has, as the bending section, the clincher unit 42, a pushing unit 124, and a clincher slider 123 and uses a clincher motor 122 to move the pushing unit 124 and clincher slider 123 at an appropriate timing. In the saddle stitching stapler 40, there is provided, on a clincher base 130, the clincher unit 42 serving as the bending section and including a clincher lifter 129 that supports and positions a clincher center 127 and a clincher left 128.

The saddle stitching stapler 40 has the configuration as described above. That is, the driver unit 41 is moved based on operation of the drive motor 56 with respect to the paper sheet bundle 100 placed on the table 120 inserted through the sheet insertion port 107. Then, holes are formed so as to penetrate the paper sheet bundle 100, and the paper-made staple 60 is inserted through the holes to bind the paper sheet bundle 100.

FIGS. 8A to 8C are views each illustrating the cutter blade 71 provided at a leading end of the driver 53 illustrated in FIG. 5 and configured to allow the paper-made staple 60 to penetrate the paper sheet bundle 100 and its operation. FIG. 8A illustrates a state where the paper-made staple 60 formed into the U-shape by the forming plate 115 is set to the cutter blade 71 by the pusher 117. When the driver unit 41 moves down in a state where the paper-made staple 60 is set to the cutter blade 71, the cutter blade 71 is inserted into the paper sheet bundle 100 while retaining the paper-made staple 60, as illustrated in FIG. 8B. Thereafter, the leg portions 61 and 62 of the paper-made staple 60 are bent inward by the pushing unit 124 and clincher unit 42 and bonded to each other. Synchronously with this operation, the driver 53 moves upward, and the paper sheet bundle 100 is bound by the paper-made staple 60. The cutter blade 71 returns to its original position as illustrated in FIG. 8C and waits for next paper-made staple 60. In this manner, the paper sheet bundle 100 is bound.

Configurations of respective parts of the saddle stitching stapler 40 are described in detail in Japanese Patent No. 4,952,129 quoted above, so descriptions thereof are omitted here.

Figure 6:
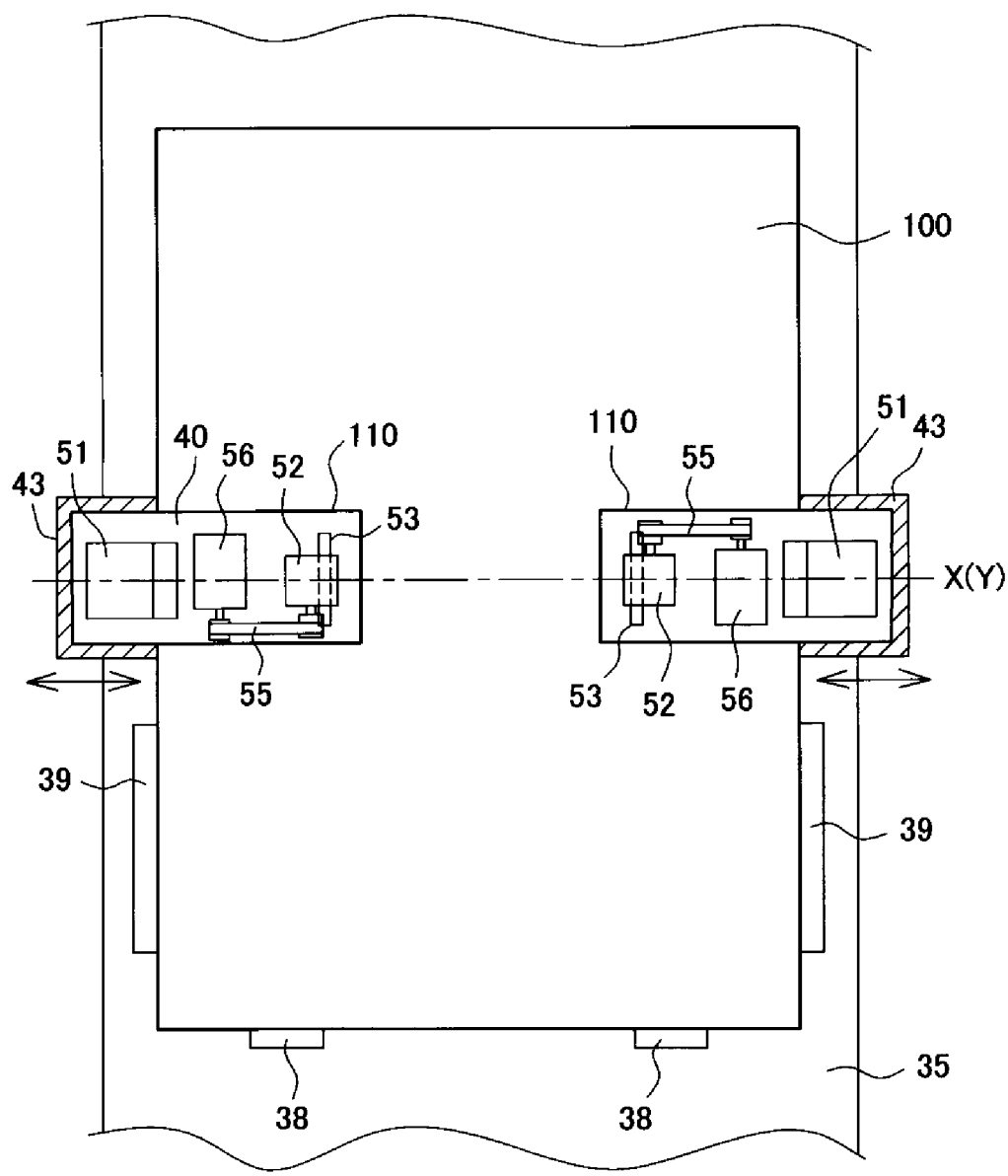
FIG. 6 is a view illustrating a state where the saddle stitching staplers of FIG. 5 are mounted to a stacker.

The following describes arrangement of the stacker section 35 of the saddle stitching stapler 40 using FIG. 6. FIG. 6 illustrates a state where the saddle stitching stapler 40 illustrated in FIG. 5 is disposed at left and right positions that cross a sheet conveying direction. That is, left and right carriages 43 having thereon the left and right saddle stitching staplers 40, respectively, are placed on the stacker section 35 so as to be movable in accordance with a length of the paper sheet in the width direction. In both the left and right saddle stitching staplers 40, the forming plate 115 that forms the paper-made staple 60 into a crown shape and the drive motor 56 that moves the driver 53 that drives the paper-made staple 60 into the paper sheet bundle are connected to the driver cam 52 through a transmission belt 55. Thus, the driver cam 52 is rotated by the drive of the drive motor 56 to drive the paper-made staple 60 into the paper sheet bundle 100. At the same time, both the leg portions 61 and 62 are bent inward by the clincher unit 42 and then bonded to each other at an adhesive portion 63 thereof, which is coated with an adhesive. The paper-made staple 60 is housed in the staple cartridge 51 of the saddle stitching stapler 40 and is cut into a size to be driven by the stapler.

The paper sheets to be saddle-stitched are conveyed to the saddle stitching stapler 40 thus configured, and leading ends thereof in the conveying direction are made to abut against the stopper 38, as illustrated in FIGS. 2 and 3 to be sequentially stacked in the stacker section 35. In this stacking, as described above, when the stopper 38 is positioned at the position Sh3 in FIG. 4, a rear end of the paper sheet (bundle) supported by the stacker section 35 enters the switchback approaching path 35a, so that a subsequent paper sheet fed from the second switchback conveying path SP2 in this state is reliably stacked on the stacked paper sheets. Thereafter, in accordance with the carrying-in of the subsequent paper sheets, the stopper 38 is moved to the position Sh1 side for stacking thereof in the stacker section 35. When the stopper 38 is positioned at the position Sh2 in FIG. 4, a center of the paper sheet (bundle) supported in the stacker section 35 is positioned to a binding position X (to be described later) of the saddle stitching stapler 40. When the stopper 38 is positioned at the position Sh1 in FIG. 4, the center of the paper sheet bundle 100 stapled and supported by the stacker section 35 is positioned to a folding position Y which is a position at which a folding blade 46 is inserted between folding rollers 45. Thus, the positions Sh1, Sh2, and Sh3 correspond respectively to a folding position, a binding position, and a subsequent sheet receiving position. This point will be described later.

For example, when the center portion of the elevated paper sheet bundle 100 in the conveying direction (length direction) coincides with the binding position X in FIGS. 4 and 6, movement of the paper sheet bundle 100 is stopped by the stopper 38, and drive of the paper-made staple 60 is waited for. The binding position X of the paper sheet and folding position Y are set to the same position, that is, the binding position also serves as the folding position.

Figure 7:
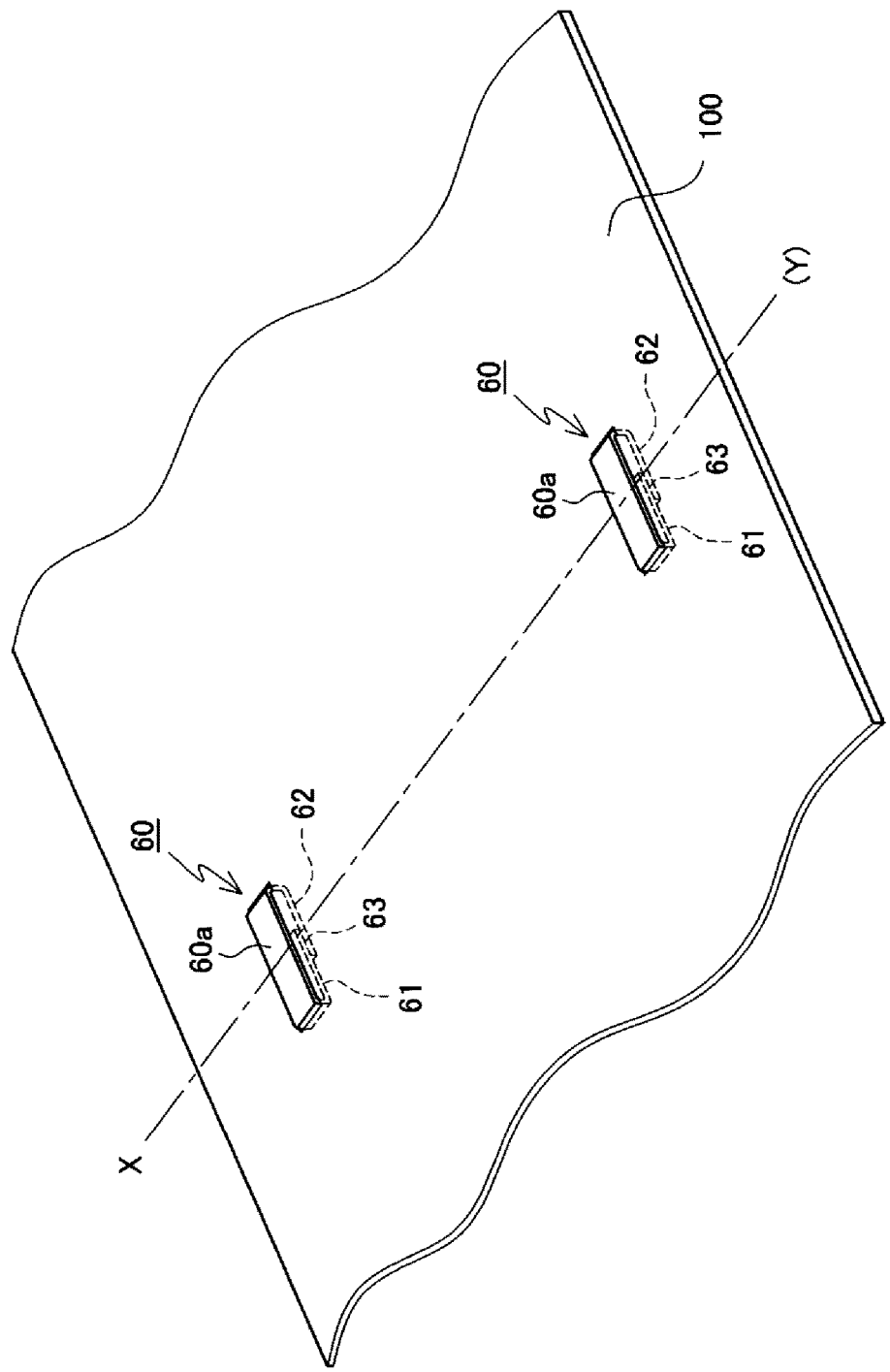
FIG. 7 is an explanatory view illustrating a state where a paper sheet bundle is bound at a position straddling a folding position of the paper sheet bundle by the saddle stitching stapler of FIG. 6.
Figure 8:
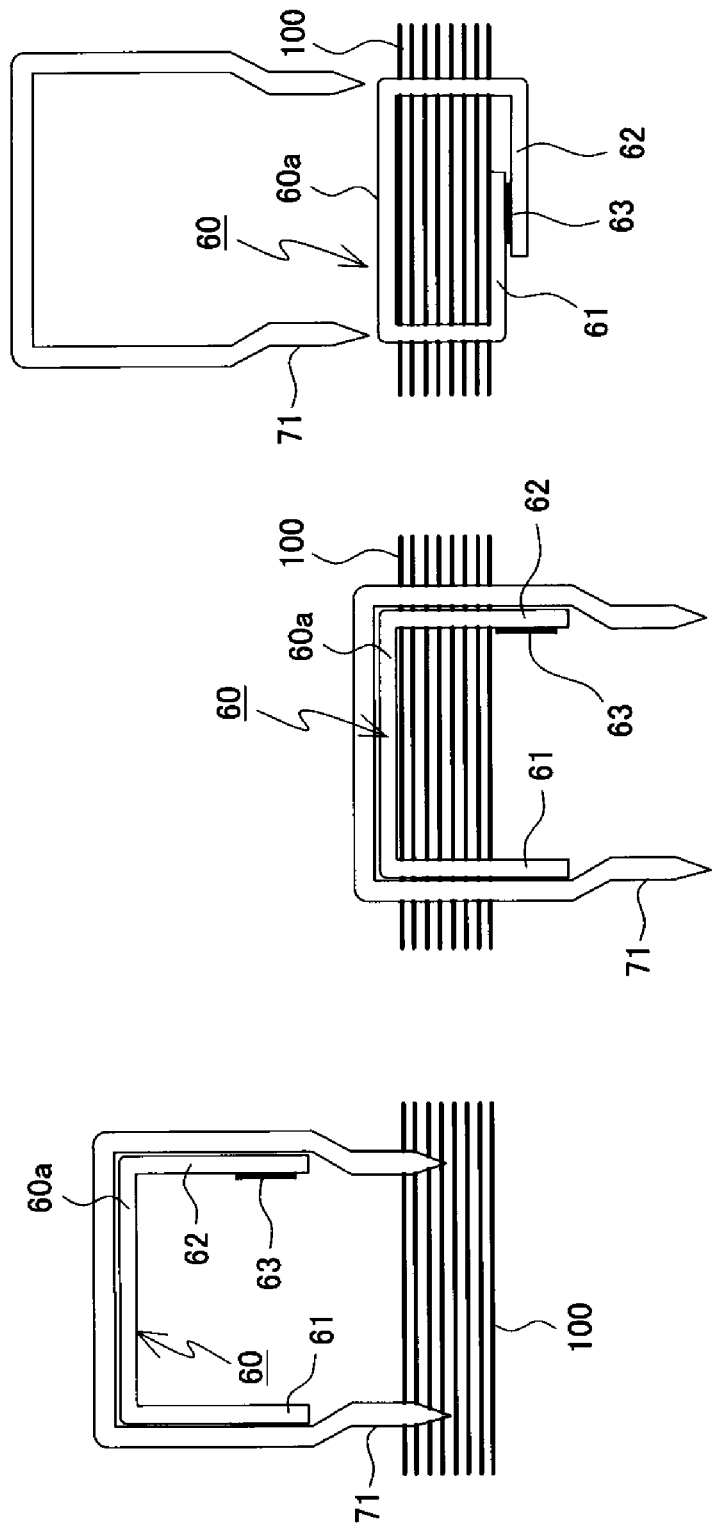
FIGS. 8A to 8C are explanatory views each illustrating a mechanism that binds the paper sheet bundle using the saddle stitching stapler of FIG. 5.

FIG. 7 illustrates a state where the paper-made staple 60 is driven into the paper sheet bundle 100 by the saddle stitching stapler 40 to complete the binding processing of the paper sheet bundle 100. The position of the paper sheet bundle 100 is set by the movement of the stopper 38 such that the paper-made staple 60 straddles the folding position in the sheet conveying direction. In FIG. 7, the leg portions 61 and 62 of the left and right paper-made staples 60 are driven, sandwiching the folding position Y therebetween such that a center of a connection portion (hereinafter, referred to as "staple leg portion connection portion 60a") of the leg portions 61 and 62 substantially coincides with the folding position Y. With this configuration, the staple leg portion connection portion 60a of the paper-made staple 60 is easily folded with the leg portions 61 and 62 inside upon folding of the paper sheet bundle. That is, the paper-made staple 60 is positioned in a substantial center portion of the paper sheet bundle 100 in the conveying direction, straddling the folding position, so as to bind the paper sheet bundle 100.

[Another Embodiment of Saddle Stitching Stapler/Vertically Separated Type]

Thus far, the saddle stitching stapler 40 of a non-separated type in which the driver 53 side and clincher unit 42 side are not separated from each other has been described. This saddle stitching stapler 40 has a configuration that an extending direction of the staple leg portion connection portion 60a of the paper-made staple 60 is set to the same direction as the sheet conveying direction and that the binding position is set so as to straddle the sheet folding position and can thus be configured as the non-separated type. On the other hand, with a separated type, as illustrated in FIGS. 9 to 11, in which the driver 53 side and clincher unit 42 side are separated from each other, it is possible to set the binding position at a position near the center of the paper sheet bundle in the width direction.

The following describes this separated type. The same reference numerals are given to the same functions as those of the non-separated type, and detailed descriptions thereof are omitted. As illustrated in FIG. 9, the driver unit 41 side and clincher unit 42 side are completely separated up and down. Thus, the mechanism, such as the driver 53, constituting the driver unit 41 is placed on a base 109 serving also as an upper sheet guide. On the other hand, a mechanism part of the clincher unit 42 is placed on a clincher base 130. Accordingly, the paper sheet bundle 100 to be bound is conveyed from a near side of FIG. 9 to a far side thereof along the table 120.

In FIG. 10, the saddle stitching staplers 40 illustrated in FIG. 9 each having a configuration in which the driver 53 side and clincher unit 42 side are completely separated up and down are mounted side by side along the binding position X. In this case, the entire bodies of the saddle stitching staplers 40 can be disposed within the stacker section 35, a width direction size can be made more compact than that illustrated in FIG. 6. Since other mechanisms are the same as those of the saddle stitching stapler 40 of FIG. 6, the descriptions thereof are omitted.

In this saddle stitching stapler 40, the driver unit 41 and clincher unit 42 are separated and face each other so as to allow the paper sheet bundle 100 to pass therebetween. This allows the paper sheet bundle 100 to be staple-bound at its center portion or other arbitrary position.

The paper sheets to be saddle-stitched are conveyed to the saddle stitching stapler 40 thus configured, and leading ends thereof in the conveying direction are made to abut against the stopper 38 serving as the leading end regulating member to be sequentially stacked in the stacker section 35. The stacking position is, as described above, set by the stopper 38 moving from the positions Sh1 to Sh3.

When the center portion of the elevated paper sheet bundle 100 in the conveying direction (length direction) coincides with the binding position X in FIGS. 4, 6, and 10, movement of the paper sheet bundle 100 is stopped by the stopper 38, and drive of the paper-made staple 60 is waited for. The binding position X of the paper sheet and folding position Y are set to the same position, that is, the binding position also serves as the folding position.

As with FIG. 7, FIG. 11 illustrates a state where the paper-made staple 60 is driven into the paper sheet bundle 100 by the saddle stitching stapler 40 to complete the binding processing of the paper sheet bundle 100. The position of the paper sheet bundle 100 is set by the movement of the stopper 38 such that the paper-made staple straddles the folding position in the sheet conveying direction. In FIG. 11, the leg portions 61 and 62 of the left and right paper-made staples 60 are driven, sandwiching the folding position Y therebetween such that a center of a connection portion (hereinafter, referred to as "staple leg portion connection portion 60a") of the leg portions 61 and 62 substantially coincides with the folding position Y. With this configuration, the staple leg portion connection portion 60a of the paper-made staple 60 is easily folded with the leg portions 61 and 62 inside upon folding of the paper sheet bundle. An interval between the paper-made staples 60 in the sheet width direction is smaller than that illustrated in FIG. 7. This is because the saddle stitching stapler 40 is configured such that upper and lower parts are separated with the sheet conveying path interposed therebetween to allow the drive position of the staple 60 to be set arbitrarily.

[Configuration of Paper-Made Staple]

The following describes the paper-made staple 60 loaded into the saddle stitching stapler 40 of the present invention with reference to FIGS. 12 to 14.

FIGS. 12A to 12C and FIG. 13 are explanatory views illustrating the paper-made staple 60 and a configuration of the rolled staple 70 in which a number of paper-made staples 60 are connected in parallel. More specifically, FIG. 12A is a detailed plan view of the paper-made staple 60. FIG. 12B is a perspective view illustrating a state where the paper-made staple 60 is formed into a substantially U-shape. FIG. 12C is a cross-sectional view illustrating a state where the paper sheet bundle 100 is bound with the paper-made staple 60. FIG. 13 is an explanatory view illustrating the rolled staple 70 in which a number of paper-made staples 60 are wound in a roll shape. The paper-made staple 60 and rolled staple 70 can have the following configurations. The basic configurations thereof are described in detail in Japanese Patent No. 4,952,129 quoted above and Japanese Patent No. 4,894,407.

As illustrated in FIG. 12A, a plurality of the paper-made staples 60 each having an elongated and substantially straight shape are connected in parallel. Each paper-made staple 60 has a width of, e.g., about 6 mm to 12 mm in the up-down direction (connection direction of the paper-made staples 60) of FIG. 12A and a width of, e.g., about 25 mm to 50 mm in the left-right direction (longitudinal direction of the paper-made staple 60) of FIG. 12A. A portion near an end portion of each paper-made staple 60 in the longitudinal direction is formed into a trapezoidal shape, and a width thereof become smaller toward its leading end. Each paper-made staple 60 has, on a rear surface thereof near an end portion in the longitudinal direction, an adhesive portion 63 coated with an adhesive.

Further, elliptic feed holes are formed at positions spaced apart by a predetermined distance from both end portions of sides of the adjacent two paper-made staples 60. A portion between the two feed holes serves as a slit portion, whereby the paper-made staples 60 are completely separated from one another. A portion from an outside end of the feed hole to an end portion of the side connected to the adjacent paper-made staple 60 serves as a connection portion 68 through which the paper-made staples 60 are connected. A feed pawl on the saddle stitching stapler 40 side is engaged with the two feed holes feed pawl, thereby gradually feeding the paper-made staples 60.

The paper-made staple 60 has a folding position slit 64 obtained by cutting inward a substantial center position of the staple leg portion connection portion 60a connecting the leg portions in the longitudinal direction of the staple. The folding position slit 64 is formed for easy and reliable folding of the paper-made staple 60 together with the paper sheet bundle 100 in the folding processing to be described later.

The individual paper-made staple 60 is separated from the connected-state staples illustrated in FIG. 12A by the saddle stitching stapler 40, and then, as illustrated in FIG. 12B, formed into a substantially U-shape defined by the staple leg portion connection portion 60a and leg portions 61 and 62 bent at left and right ends of the staple leg portion connection portion 60a at substantially right angles. Then, as illustrated in FIG. 12C, in the paper-made staple 60 formed into the substantially U-shape, both the leg portions 61 and 62 penetrating the paper sheet bundle 100 are bent along the paper sheet bundle 100, and one leg portion 61 and the other leg portion 62 having the adhesive portion 63 are bonded to each other. Then, when the paper sheet bundle 100 is folded with the leg portion side inside in a state where the paper sheet bundle 100 is bound with the paper-made staple 60, the paper-made staple 60 can easily be folded since the folding position slit 64 is formed in the substantial center portion of the staple leg portion connection portion 60a connecting the leg portions 61 and 62.

The paper-made staple 60 illustrated in FIGS. 12A to 12C has the adhesive portion 63 on the rear surface of one leg portion 62 in the longitudinal direction; however, the adhesive portion 63 may be provided on rear surfaces of both leg portions 61 and 62. In this case, not only the leg portions 61 and 62 are bonded to each other, but also the leg portion 61 is bonded to a rear surface of the paper sheet bundle, thereby increasing the bonding strength. Also in this paper-made staple 60, the folding position slit 64 is formed in the staple leg portion connection portion 60a, so that the paper-made staple 60 can reliably be folded. As illustrated in FIG. 13, the paper-made staples 60 are wound in a roll shape (rolled staple 70) and housed in the saddle stitching stapler 40.

Figure 14A:
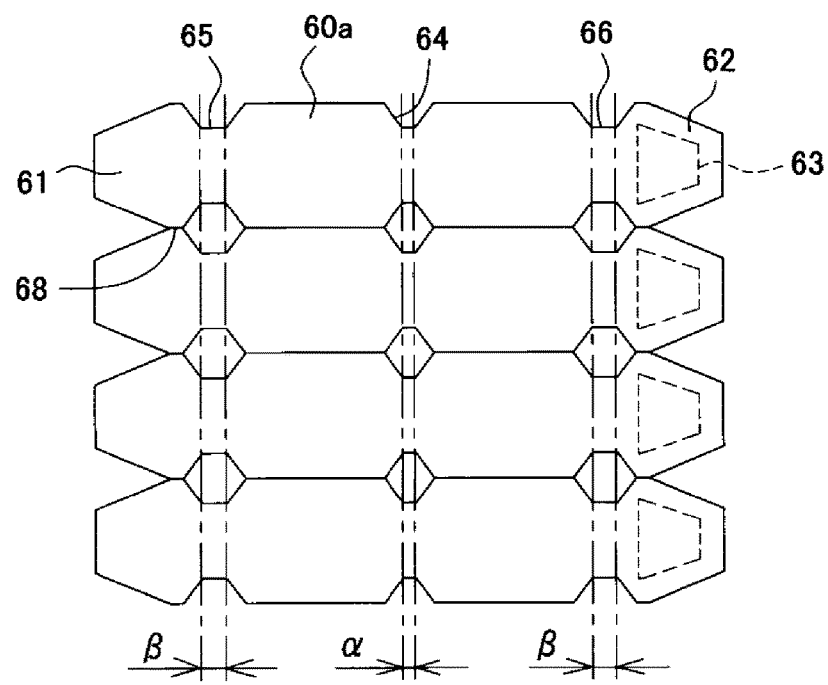
Figure 14B:
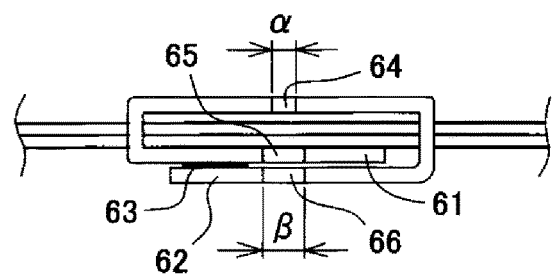

Further, the paper-made staple 60 of the present invention is subjected to the following processing so as to be reliably folded after the binding processing. That is, the paper-made staple 60 has, in addition to the folding position slit 64 of FIG. 12A formed in the center portion of the staple leg portion connection portion 60a, the folding position slits 64 in the both leg portions 61 and 62 as illustrated in FIG. 14A. Thus, as illustrated in FIG. 14B, when the leg portions are bonded to each other, the folding position slit 64 of the staple leg portion connection portion 60a and leg portion side folding position slits 65 and 66 overlap with each other. When the folding processing is performed, the paper-made staple 60 is folded at the folding position slits 64, 65, and 66.

Particularly, in the configuration illustrated in FIGS. 14A and 14B, a width β of each of the folding position slits 65 and 66 in the slit longitudinal direction is set larger than a width α of the folding position slit 64 in the stapler longitudinal direction (β>α). Thus, even when the number of the paper sheets to be bundled are increased to cause a slight displacement of the leg side folding position slits, the folding position slit 64 of the staple leg portion connection portion 60a and leg portion side folding position slits 65 and 66 overlap with each other. As a result, the paper-made staple 60 is folded at the overlapping range and can thus be folded at the substantially center portion of the paper-made staple 60 in the longitudinal direction together with the paper sheet bundle 100 bound with this paper-made staple 60.

[Configuration of Folding Roller]

Figure 15A:
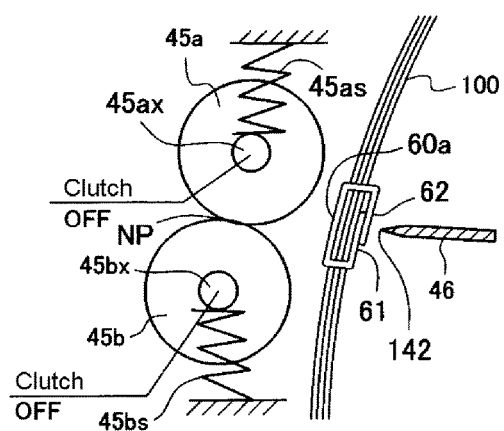

The following describes a configuration of the folding roller 45. The folding roller 45 for folding the paper sheet bundle as illustrated in FIG. 15A and folding blade 46 for inserting the paper sheet bundle into a nip position NP of the folding roller 45 are disposed at the folding position Y set on the downstream side of the saddle stitching stapler 40. The folding roller 45 includes rollers 45a and 45b which are brought into pressure contact with each other, and each of the rollers 45a and 45b have a length corresponding to the substantially maximum width of the paper sheet. Rotary shafts 45ax and 45bx of the respective rollers 45a and 45b constituting the folding roller 45 are fitted to long grooves of a not illustrated device frame and are biased in a pressure-contact direction by respective compression springs 45aS and 45bS so as to bring the rollers 45a and 45b into pressure contact with each other. The folding roller 45 may have a structure in which at least one of the rollers 45a and 45b is axially supported so as to be movable to the pressure-contact direction and is provided with the compression spring.

The pair of rollers 45a and 45b are each formed of a material, such as a rubber, having a large friction coefficient. This is for conveying the paper sheet bundle in a roller rotation direction while folding the same by a soft material such as a rubber, and the rollers 45a and 45b may be formed by applying lining to a rubber material.

Figure 17:
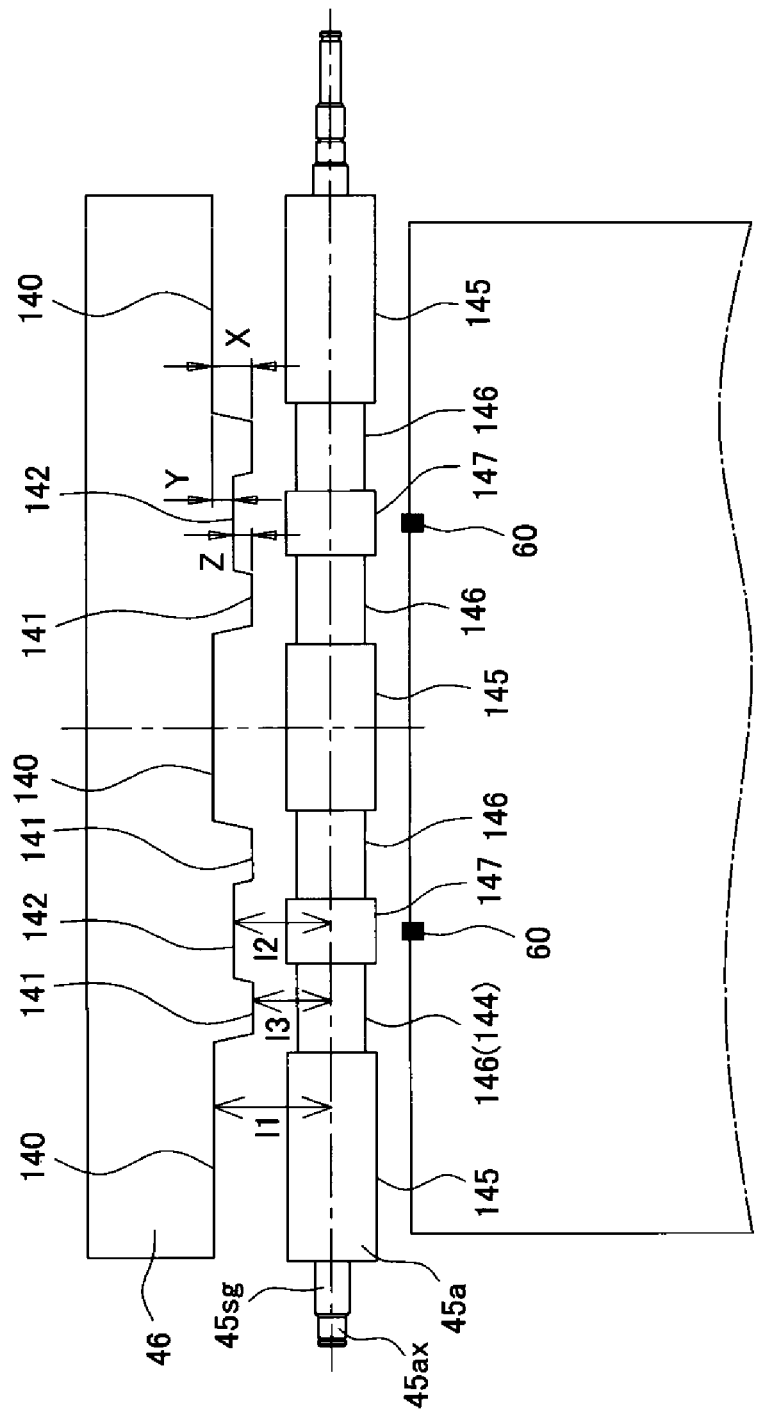
FIG. 17 is a view explaining positions and shapes of the folding roller and folding blade of the sheet bundle folding unit of FIGS. 2 and 4 and paper-made staple.

The folding roller 45 has a concavo-convex shape as illustrated in FIG. 17, and predetermined gaps 144 are disposed in the sheet width direction. FIG. 17 only illustrates one roller 45a of the folding roller 45; actually, however, the other roller 45b having the same configuration is brought into pressure contact with the roller 45a as illustrated in FIG. 15A.

The roller 45a of the folding roller 45 has, from one end to a center thereof, a large-diameter portion 145 long in the sheet width direction, a folding roller small-diameter portion 146 into which a leading end of the folding blade 46 to be described later, a large diameter portion 147 short in the sheet width direction, and the long large-diameter portion 147. The roller 45a has a left-right symmetric shape with respect to the center thereof as illustrated in FIG. 17, and the other roller 45b not illustrated in FIG. 17 also has the same shape. Thus, in each of the rollers 45a and 45b, the above-mentioned gaps 144 are formed in ranges corresponding to the roller small-diameter portions 146. The gaps 144 are disposed so as to corresponding to the convexities of the folding blade 46 as described below. This allows the leading end of the folding blade to easily enter the nip between the rollers 45a and 45b.

Further, as illustrated in FIG. 17, the leading end of the folding blade has a configuration in which a folding blade short portion 141 (longest leading end portion of the folding blade 46 in a direction perpendicular to a length direction of the folding roller 45) corresponding to the gap 144, i.e., the roller small-diameter portion 146 is located closest to a joining point 45sg of the folding roller 45, and a folding blade long portion 140 (shortest leading end portion of the folding blade 46 in the direction perpendicular to a length direction of the folding roller 45 corresponding to the roller large-diameter portion 145 is located farthest from the joining point 45*sg* of the folding roller 45. With this configuration, it is possible to reliably insert the folding blade short portion 141 between the folding rollers 45*a* and 45*b* so as to fold the paper sheet bundle 100 in half and to prevent the folding blade long portion 140 from stopping its operation by being held between the rollers 45*a* and 45*b*.

Further, as illustrated in FIG. 17, the roller large-diameter portion 147 having a comparatively short width is positioned corresponding to a position at which the paper-made staple 60 is driven, and a folding blade moderately long portion 142 having a length shorter than the folding blade long portion 140 and longer than the folding blade short portion 141 is positioned corresponding to the roller large-diameter portion 147. That is, the leading end portion of the folding blade 46 is configured such that a distance between the folding blade long portion 140 and joining point 45*sg* of the rollers 45*a* and 45*b* is set to a largest value L1, a distance between the folding blade short portion 141 and joining point 45*sg* is set to a smallest value L3, and a distance between the folding blade moderately long portion 142 and joining point 45*sg* of the rollers 45*a* and 45*b* is set to a value L2 between the L1 and L3. In other words, the folding blade moderately long portion 142 has an intermediate length y obtained by subtracting a length z from a length x between a leading end of the folding blade long portion 140 and a leading end of the folding blade short portion 141. The length z is set to about 0.3 mm to 0.6 mm.

Figure 15B:
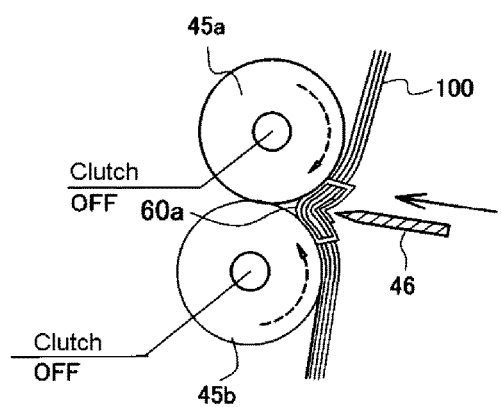
Figure 15C:
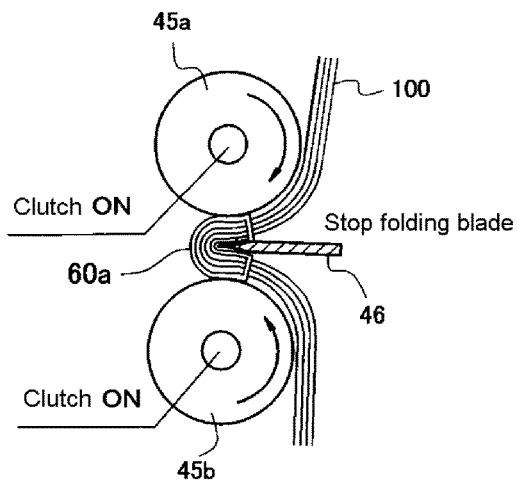

The intermediate length is set so as to correspond to a portion at which the paper-made staple 60 straddles the folding position of the paper sheet bundle, and the length of the leading end of the folding blade is set such that a position at which the leg potions 61 and 62 overlap each other is held by the folding roller as illustrated in FIG. 15A and so as not to hinder the operation of the folding blade 46. Thus, as illustrated in FIG. 15B, the leg portions 61 and 62 of the paper-made staple 60 penetrating the paper sheet bundle 100 and bonded to each other are held by the roller large-diameter portions 147 of the folding roller 45, whereby the paper-made staple can also be folded.

[Another Embodiment of Folding Blade and Folding Roller]

Figure 18:
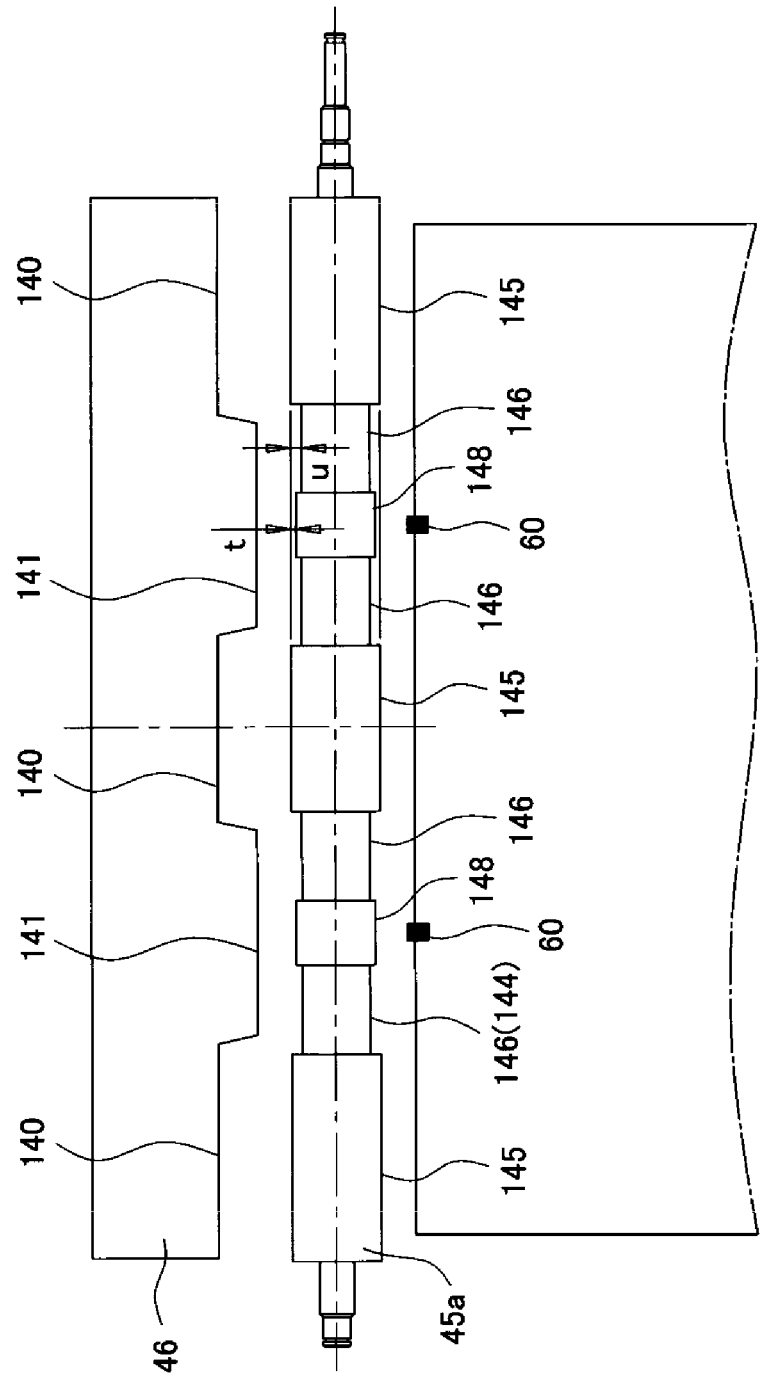
FIG. 18 is a view explaining positions and shapes of the folding roller and folding blade of a sheet bundle folding unit according to another embodiment and a paper-made staple.

In the folding mechanism illustrated in FIG. 17, the distance between the leading end of the folding blade 46 and joining point 45*sg* of the rollers 45*a* and 45*b* is set in three stages, and correspondingly, the diameter of each of the rollers 45*a* and 45*b* is set in two stages (large- and small-diameter portions). Alternatively, however, a configuration as illustrated in FIG. 18 may be adopted.

That is, the folding blade 46 has a two-stage configuration including the folding blade long portion 140 corresponding to the large-diameter portion 145 of the roller 45*a*, the distance from which to the joining point 45*sg* of the rollers 45*a* and 45*b* is large and the folding blade short portion 141 corresponding to the small-diameter portion, the distance from which to the joining point 45*sg* is small. The rollers 45*a* and 45*b* each include, in addition to the folding roller large-diameter portion 145 and folding roller small-diameter portion 146, a roller intermediate-diameter portion 148 having an intermediate diameter between the diameters of the folding roller large-diameter portion 145 and folding roller small-diameter portion 146 at a position corresponding to the folding blade short portion 141. The position of the intermediate-diameter portion 148 corresponds to the portion at which the paper-made staple 60 straddles the folding position of the paper sheet bundle 100.

Thus, the folding blade short portion 141 pushes the paper sheet bundle into the gap 144 between the folding roller small-diameter portions 146. On the other hand, a range corresponding to the binding position of the paper-made staple 60 corresponds to the intermediate-diameter portion 148, the paper-made staple 60 after binding is pushed toward the folding roller 45 by the intermediate-diameter portion 148.

Particularly, in the configuration according to the present invention, the folding blade 46 pushes the paper-made staple 60 from the bonded leg portions 61 and 62 side, thereby increasing the bonding strength.

Figure 16:
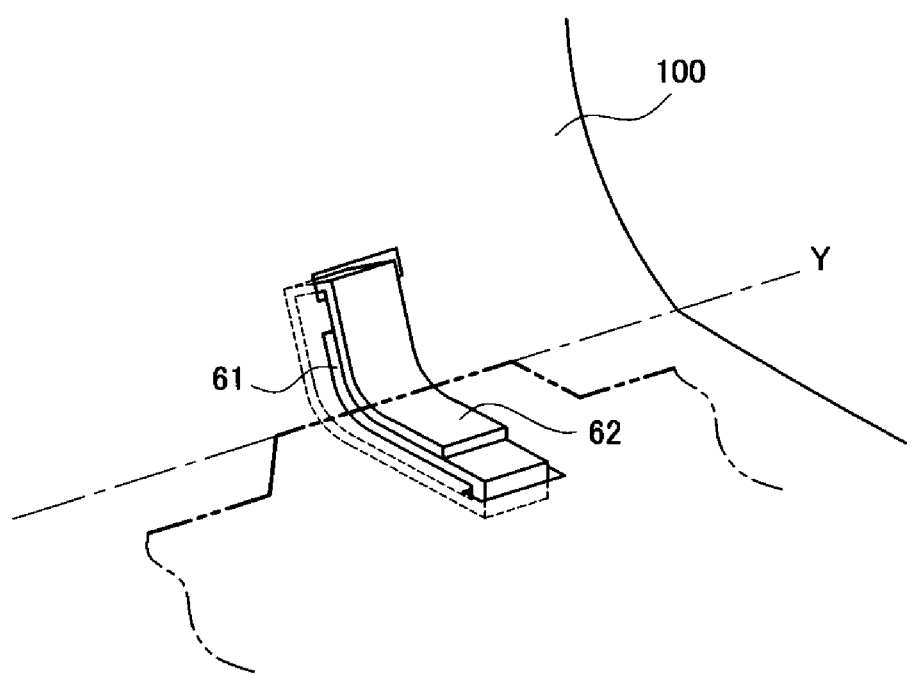
FIG. 16 is a perspective view illustrating a state where the paper sheet bundle and paper-made staple are folded.

Further, as illustrated in FIGS. 16 and 19, by adjusting a degree of overlapping between the leg portions 61 and 62 of the paper-made staple 60 when the leg portions 61 and 62 are pushed between the rollers 45*a* and 45*b* by the folding blade short portion 141 of the folding blade 46, it is possible to increase a bonding (binding) degree or folding accuracy.

Figure 19A:
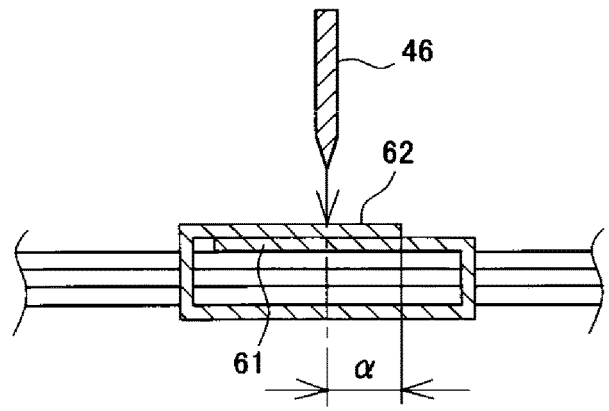
Figure 19B:
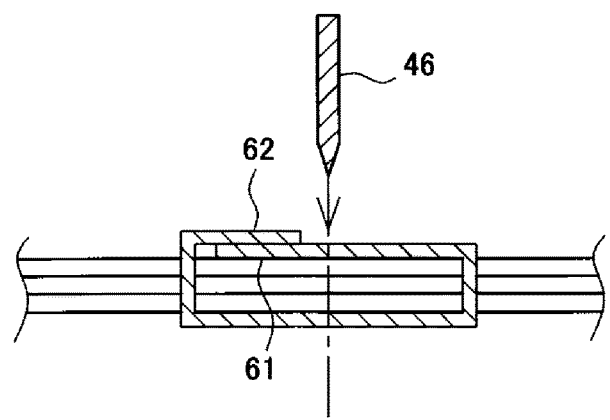

That is, as illustrated in FIG. 19A, when the overlapping area between the leg portions 61 and 62 of the paper-made staple 60 is set large (overlapping area is increased by a length α from the folding position), both the leg portions 61 and 62 are pushed by the folding blade 46, so that it is expected that the bonding strength between the leg portions is increased. On the other hand, in FIG. 19B, the leg portions 61 and 62 do not overlap each other at an abutting position of the folding blade 46. In this case, the folding operation is made easier since the leg portions 61 and 62 do not overlap each other. Thus, whether to increase the bonding (binding) strength or folding accuracy can be set arbitrarily by an operator selecting the position of the paper-made staple 60.

The above rollers 45*a* and 45*b* are each connected to a not illustrated roller drive means. The roller drive means includes a roller drive motor M6 and a transmission mechanism (transmission means). The transmission means is constituted by a transmission belt transmitting rotation of the roller drive motor M6 while reducing a speed thereof.

The following describes a configuration of a blade drive means for driving the folding blade 46. The folding blade 46 is supported to a not illustrated device frame through a guide rail so as to be freely movable in a sheet folding direction (see FIG. 15). More specifically, the folding blade 46 is supported so as to be reciprocatable between a standby position at which it is retracted from the paper sheet supported in the stacker section 35 and the nip position NP of the folding roller 45. Although not illustrated, the blade drive means for reciprocating the folding blade 46 includes a blade drive motor M7 and a transmission belt for transmitting rotation of the motor M7.

Thus, when the blade drive motor M7 is forwardly and reversely rotated, the folding blade 46 is reciprocated between the standby position and nip position NP along the guide rail. The folding blade 46 is constituted by a plate-like member having a knife edge extending in the sheet width direction, and the leading end thereof is formed into the concavo-convex shape as illustrated in FIGS. 17 and 18.

[Folding Operation]

The following describes a state where the paper sheet bundle is folded by the folding roller 45 and folding blade 46 having the above configurations with reference to FIGS. 15A to 15D. The paper sheet bundle 100 supported in a bundle in the stacker section 35 is stopped by the stopper in a state illustrated in FIG. 15A, and the folding position of the paper sheet bundle 100, at which the stapler has been driven, is positioned at the folding position Y.

As described above, the paper sheet bundle 100 has been bound with the paper-made staple 60 by the saddle stitching stapler 40 and, as illustrated, the staple leg portion connection portion 60a of the paper-made staple 60 is positioned on the folding roller 45 side, and leg portions 61 and 62 are positioned on the folding blade 46 side. The staple leg portion connection portion 60a straddles the folding position Y of the folding blade 46. In FIG. 15A, the staple leg portion connection portion 60a is positioned at the substantial center. This position is controlled by the stopper 38 that regulates a leading end of the paper sheet bundle and, a set completion signal is output when the paper sheet bundle 100 is set at this position.

Upon acquisition of the set completion signal, a sheet bundle folding operation controller 97 rotates the motor M6 at a speed lower than a moving speed of the folding blade 46. This is for producing a condition under which the first and second rollers 45a and 45b are driven into rotation by the paper sheet bundle to be inserted into the nip position by the folding blade 46, as described later.

The sheet bundle folding operation controller 97 moves the folding blade 46 from the standby position to nip position NP at a predetermined speed VB. On the other hand, a rotary peripheral speed VR of the folding roller 45 is set to zero or a value lower than the moving speed VB. Then, as illustrated in FIG. 15B, the paper sheet bundle is bent by the folding blade 46 at the folding position and is inserted between the first and second rollers 45a and 45b. At this time, the first and second rollers 45a and 45b are driven into rotation along with the movement of the paper sheet bundle by the folding blade 46. Then, the sheet bundle folding operation controller 97 stops the blade drive motor M7 after elapse of an estimated time period during which the paper sheet bundle 100 reaches a predetermined nip position to stop the folding blade 46 at a position illustrated in FIG. 15C. In this state, the paper-made staple 60 is also folded and held between the rollers 45a and 45b. Further, the folding blade 46 is pushed to the leg portions 61 and 62 side of the paper-made staple 60, so that the bonding strength between the leg portions is increased. This state is illustrated in FIG. 16 as a perspective view.

Thereafter, the sheet bundle folding operation controller 97 drives the first and second rollers 45a and 45b in rotation once again. Then, the paper sheet bundle 100 is fed in a delivery direction (leftward in FIG. 15D).

Figure 15D:
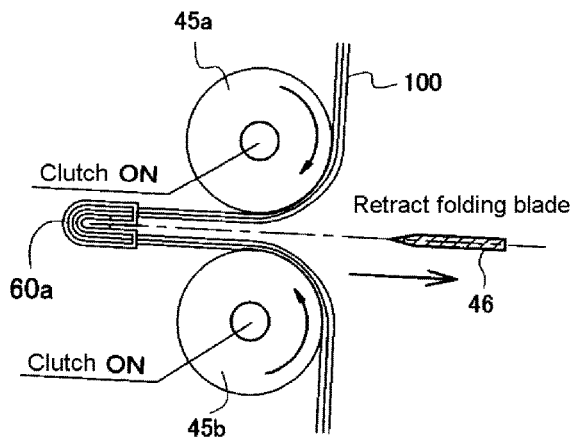

Thereafter, as illustrated in FIG. 15D, the sheet bundle folding operation controller 97 moves the folding blade 46 positioned at the nip position NP to the standby position concurrently with the delivery of the paper sheet bundle 100 by the rollers 45a and 45b.

At the same time, the paper sheet bundle 100 and paper-made staple 60 straddling the folding portion of the paper sheet bundle 100 are folded with the leg portions 61 and 62 of the paper-made staple 60 inside. As a result, in a folded state, the leg portions 61 and 62 are positioned inside a booklet, so that peeling of the bonded portion and turning-up of the leg portions 61 and 62.

[Control Configuration]

Figure 20:
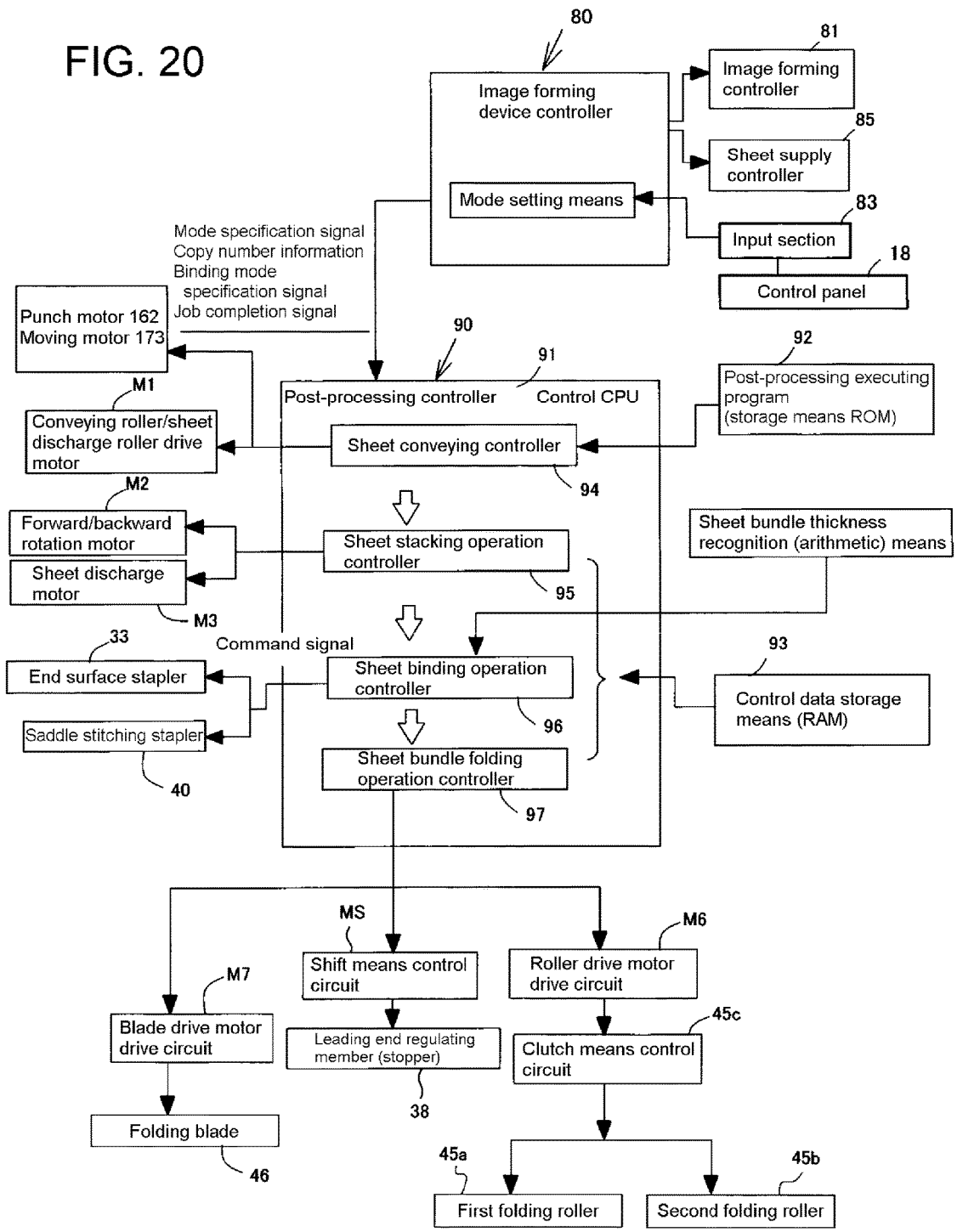
FIG. 20 is an explanatory view of a control configuration of the system of FIG. 1.

The following describes a control configuration of the above-described image forming system with reference to a block diagram of FIG. 20. The image forming system illustrated in FIG. 1 includes a controller (hereinafter, referred to as "main controller") 80 of the image forming device A and a controller (hereinafter, referred to as "post-processing controller") 90 of the sheet post-processing device B. The main controller 80 includes an image forming controller 81, a sheet supply controller 85, and an input section 83. A user sets "image forming mode" or "post-processing mode" through a controller panel 18 provided in the input section 83. As described above, in the image forming mode, the image forming conditions such as a print copy count specification, a sheet size specification, a color or black-and-white printing specification, enlarged or reduced printing specification, a single- or double-side printing specification are set. Then, the main controller 80 controls the image forming controller and sheet supply controller according to the set image forming conditions to form an image onto a predetermined paper sheet and carries out the resultant paper sheet through the main body discharge port 3.

At the same time, the user sets the post-processing mode through the controller panel 18. The post-processing mode includes, e.g., a "print-out mode", a "staple-binding mode", and a "sheet bundle folding mode". The main controller 80 transfers the set post-processing mode, copy number information, and binding mode (binding at one or a plurality of positions) information to the post-processing controller 90. At the same time, the main controller 80 transfers a job completion signal to the post-processing controller 90 every time the image formation is completed.

The post-processing controller 90 includes a control CPU 91 that operates the sheet post-processing device B in accordance with the specified mode, a ROM 92 that stores an operation program, and a RAM 93 that stores control data. The control CPU 91 includes a sheet conveying controller 94 that executes conveyance of the paper sheet fed to the carry-in port 23, a sheet stacking operation controller 95 that executes sheet stacking operation, a sheet binding operation controller 96 that executes sheet binding processing, and a sheet bundle folding operation controller 97 that executes sheet bundle folding operation.

The sheet conveying controller 94 is connected to a control circuit of the drive motor M1 for the carry-in roller 24 and sheet discharge roller 25 disposed in the sheet carry-in path P1 so as to receive a detection signal from a sheet sensor SE1 disposed in the sheet carry-in path P1. The sheet stacking operation controller 95 is connected to drive circuits of the respective forward/backward rotation motor M2 and sheet discharge motor M3 for the rear end regulating member 32 so as to stack the paper sheets in the processing tray 29. The sheet binding operation controller 96 is connected to drive circuits of the drive motor 56 and clincher motor 122 incorporated respectively in the end surface stapler 33 disposed in the processing tray 29 and saddle stitching stapler 40 of the stacker section 35.

The sheet bundle folding operation controller 97 is connected to a drive circuit of the roller drive motor M6 that drives the rollers 45a and 45b (first and second folding rollers in FIG. 20) of the folding roller 45 into rotation and a drive circuit of the blade drive motor M7 that moves the folding blade 46 for pushing the paper sheet bundle between the rollers 45a and 45b of the folding roller 45. Further, the sheet bundle folding operation controller 97 is connected to a control circuit of the shift means MS that controls movement of the stopper 38 of the stacker section 35 to a predetermined position.

The post-processing controller 90 thus configured controls the sheet post-processing device to execute the following processing operations.

[Print-out Mode]

In this print-out mode, the image forming device A performs image formation on a series of pages from the first page and sequentially carries out in facedown the resultant pages from the main body discharge port 3. Correspondingly, the sheet post-processing device B moves the path switching piece 27 to a position indicated by a continuous line of FIG. 3. As a result, the paper sheet fed to the sheet carry-in path P1 is guided to the sheet discharge roller 25. After elapse of an estimated time period (estimated based on a signal output by a sheet sensor SE1 detecting a leading end of the paper sheet) during which a leading of the paper sheet reaches the forward/backward rotation roller 30 of the processing tray 29, the sheet conveying controller 94 moves down the forward/backward rotation roller 30 from an upper standby position to the tray and rotates the same in a clockwise direction in FIG. 3. Then, the paper sheet entering the processing tray 29 is carried out toward the first sheet discharge tray 21 and housed thereon. In this manner, the subsequent paper sheets are sequentially carried out to the first sheet discharge tray 21 and housed thereon.

Thus, in the print-out mode, the paper sheet onto which an image has been formed by the image forming device A is housed on the first sheet discharge tray 21 through the sheet carry-in path P1 of the sheet post-processing device B. On the first sheet discharge tray 21, the paper sheets are sequentially stacked upward in facedown in the order from the first page to n-th page.

[Staple Binding Mode]

In this staple binding mode, the image forming device A performs image formation on a series of pages from the first page to n-th page and sequentially carries out in facedown the resultant pages from the main body discharge port 3, as in the print-out mode. Correspondingly, the sheet post-processing device B moves the path switching piece 27 to a position indicated by the continuous line of FIG. 3. As a result, the paper sheet fed to the sheet carry-in path P1 is guided to the sheet discharge roller 25. After elapse of an estimated time period (estimated based on the signal output by the sheet sensor SE1 detecting the leading end of the paper sheet) during which the leading of the paper sheet reaches the forward/backward rotation roller 30 of the processing tray 29, the sheet conveying controller 94 moves down the forward/backward rotation roller 30 from the upper standby position to the tray and rotates the same in the clockwise direction in FIG. 3. Then, after elapse of an estimated time period during which a rear end of the paper sheet is carried-in on the tray 29, the sheet conveying controller 94 drives the forward/backward rotation roller 30 into rotation in a counterclockwise direction in FIG. 3. Then, the paper sheet fed from the sheet discharge port 25a is conveyed in a switchback manner along the first switchback conveying path SP1 toward the processing tray 29. By repeating this sheet conveying operation, a series of the paper sheets are stacked in facedown on the processing tray 29 in a bundled state.

Every time the paper sheet is stacked on the processing tray 29, the post-processing controller 90 activates a side aligning plate 34b to align width direction positions of the paper sheets to be stacked. Then, upon reception of the job completion signal from the image forming device A, the CPU 91 activates the end surface stapler 33 to bind rear end edges of the paper sheet bundle stacked on the tray. After this stapling operation, the sheet stacking operation controller 95 moves the rear end regulating member 32 serving also as a bundle carry-out means from a position indicated by a dashed line of FIG. 3 toward the first sheet discharge tray 21. Then, the staple-bound paper sheet bundle is carried out onto the first sheet discharge tray 21 and housed thereon. As a result, a series of the paper sheets onto each of which the image has been formed by the image forming device A are staple-bound and housed on the first sheet discharge tray 21.

[Sheet Bundle Folding Mode]

In this sheet bundle folding mode, the image forming device A finishes the paper sheet bundle to a booklet shape using the sheet post-processing device B. To this end, the sheet post-processing device B moves the path switching piece 27 of the sheet carry-in path P1 to the position indicated by the continuous line of FIG. 3. As a result, the paper sheet fed to the sheet carry-in path P1 is guided to the sheet discharge roller 25. Then, with reference to a signal from the sheet sensor SE1 detecting the leading end of the paper sheet, the sheet discharge roller 25 is stopped at a timing at which the rear end of the paper sheet passes the path switching piece 27 and, at the same time, the path switching piece 27 is moved to a position indicated by a dashed line of FIG. 3. Then, the sheet discharge roller 25 is rotated backward (in the counterclockwise direction in FIG. 3). Then, the conveying direction of the paper sheet entering the sheet carry-in path P1 is reversed, with the result that the paper sheet is guided from the path switching piece 27 to the second switchback conveying path SP2 and then guided to the second processing tray (stacker) by the conveying rollers 36 and 37 disposed in the second switchback conveying path SP2.

At a timing at which the paper sheet is carried in from the second switchback conveying path SP2 to the stacker section 35, the sheet bundle folding operation controller 97 serving as a stopper controller moves the stopper 38 for regulating the sheet leading end to a position (in this case, position Sh1) corresponding to a sheet length through the shift means control circuit MS. Then, the paper sheet is supported by the stacker section as a whole. In this state, the post-processing controller 90 activates an aligning member 39 to align the paper sheets in the width direction thereof. The aligning member 39 need not be activated when the first sheet is housed in the stacker section 35. Further, the aligning member 39 need not be activated every time the paper sheet is housed in the stacker section 35.

Then, the sheet bundle folding operation controller 97 moves the stopper 38 to the position Sh3 at which the sheet rear end enters the switchback approaching path 35a. Then, the rear end of the paper sheet supported by the guide of the stacker section 35 enters the switchback approaching path 35a. In this state, the subsequent paper sheets are fed from the second switchback conveying path SP2 to the stacker section 35 and stacked on the preceding paper sheet. Then, in accordance with the carrying-in of the subsequent paper sheets, the stopper 38 is moved from the position Sh3 to the position Sh1 side. Thus, the positions Sh1, Sh2, and Sh3 which are stop positions of the stopper 38 correspond respectively to the folding position, binding position, and subsequent sheet receiving position.

As above, the aligning member 39 is activated to align the carried-in paper sheet and paper sheets supported on the guide with each other in the width direction. By repeating such operations, the paper sheets on each of which the image has been formed by the image forming device A are conveyed, through the second switchback conveying path SP2, onto the stacker section 35 and are then aligned. Then, the sheet bundle folding operation controller 97 receives the job completion signal and moves the stopper 38 to the position Sh2 to position the center of the paper sheet bundle at the binding position X.

Then, the sheet binding operation controller 96 activates the saddle stitching stapler 40 to staple-bind the paper sheet bundle at two positions around the sheet center (the number of the binding positions may be changed according to the need, and, for example, one or two or more binding positions may be set). Upon reception of a completion signal of the binding operation, the sheet bundle folding operation controller 97 moves the stopper 38 to the position Sh1 to position the sheet center at the folding position Y. Then, the folding processing is performed for the paper sheet bundle 100 with a sequence illustrated in FIGS. 15A to 15D, and then the resultant paper sheet bundle 100 is carried out to the second discharge tray 22.

As described above, the sheet post-processing device according to the present invention is configured to bind the paper sheet bundle with the paper-made staple 60 at the folding position along which the paper sheet bundle is folded such that the staple leg portion connection portion 60a of the paper-made staple 60 connecting the staple leg portions 61 and 62 is positioned so as to straddle the sheet folding position in a direction substantially crossing the same, i.e., in the sheet conveying direction, and the post-processing controller 90 sets the position of the paper sheet bundle by means of the stopper 38 so as to allow the paper sheet bundle 100 and staple leg portion connection portion 60a of the paper-made staple 60 for use in binding the paper sheet bundle to be folded by the folding roller 45 and folding blade 46.

Thus, the paper sheet bundle can be bound without use of the metallic staple as in the conventional approach, and the paper sheet bundle folded in a booklet form can be opened at the folding position with less damage of the paper sheets and less feeling of strangeness than in the conventional approach.

What is claimed is:

1. A paper-made staple to bind a sheet bundle, comprising:
a pair of leg portions adapted to be inserted into the sheet bundle and then bent inward; and
a connection portion that connects the leg portions in a staple longitudinal direction,
wherein the connection portion has, at an edge portion thereof, a cut in a direction crossing the longitudinal direction so as to correspond to a predetermined folding position of the sheet bundle for facilitating folding of the connection portion.

2. The paper-made staple according to claim 1, wherein the cut is formed inward from the edge portion so as to have a substantially triangular shape and is provided on two edge portions of the connection portion of the paper-made staple.

3. The paper-made staple according to claim 1, wherein an adhesive portion through which the inwardly bent leg portions bent to each other is provided on the pair of leg portions to be inserted into the sheet bundle.

4. The paper-made staple according to claim 1, wherein each of the leg portions has a leg portion side cut at a position overlapping the cut of the connection portion when the leg portions are bent inward.

5. The paper-made staple according to claim 4, wherein a width of the leg portion side cut in the longitudinal direction of the paper-made staple is set larger than a width of the connection portion cut in the longitudinal direction.

6. A paper-made staple assembly comprising a plurality of paper-made staples as claimed in claim 1, wherein said plurality of paper-made staples are partly connected in a direction crossing a longitudinal direction of the paper-made staples.

7. A paper-made staple to bind a sheet bundle, comprising:
a pair of leg portions adapted to be inserted into the sheet bundle and then bent inward; and
a connection portion that connects the leg portions in a staple longitudinal direction at a position straddling a predetermined folding position,
wherein the connection portion has, at an edge portion thereof, a cut in a direction crossing the longitudinal direction so as to correspond to a predetermined folding position of the sheet bundle for facilitating folding of the connection portion.

8. The paper-made staple according to claim 7, wherein the cut is formed inward from the edge portion so as to have a substantially triangular shape and is provided on two edge portions of the connection portion of the paper-made staple.

9. The paper-made staple according to claim 7, wherein an adhesive portion through which the inwardly bent leg portions bent to each other is provided on the pair of leg portions to be inserted into the sheet bundle.

10. The paper-made staple according to claim 7, wherein each of the leg portions has a leg portion side cut at a position overlapping the cut of the connection portion when the leg portions are bent inward.

11. The paper-made staple according to claim 10, wherein a width of the leg portion side cut in the longitudinal direction of the paper-made staple is set larger than a width of the connection portion cut in the longitudinal direction.

12. A paper-made staple assembly comprising a plurality of paper-made staples as claimed in claim 7, wherein said plurality of paper-made staples is partly connected in a direction crossing a longitudinal direction of the paper-made staples.

13. The paper-made staple assembly according to claim 12, wherein the paper-made staples partly connected to each other as the paper-made staple assembly are wound in a roll shape.

14. The paper-made staple assembly according to claim 7, wherein the paper-made staples partly connected to each other as the paper-made staple assembly are wound in a roll shape.

* * * * *